United States Patent
Ramachandran et al.

(10) Patent No.: US 9,794,148 B1
(45) Date of Patent: Oct. 17, 2017

(54) NODE PROTECTION FOR STACKED LABELS

(71) Applicant: Juniper Networks, Inc., Sunnyvale, CA (US)

(72) Inventors: Chandrasekar Ramachandran, Bangalore (IN); Hannes Gredler, Pillberg (AT); Balaji Rajagopalan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 276 days.

(21) Appl. No.: 14/587,456

(22) Filed: Dec. 31, 2014

(51) Int. Cl.
*G06F 15/177* (2006.01)
*H04L 12/26* (2006.01)
*H04L 12/24* (2006.01)

(52) U.S. Cl.
CPC ...... *H04L 43/0829* (2013.01); *H04L 41/0803* (2013.01)

(58) Field of Classification Search
CPC ..... H04L 12/18; H04L 12/66; H04L 12/4637; H04L 45/00; H04L 45/02; H04L 45/22; H04L 43/50
USPC .................. 709/239; 370/216–218, 225, 228
See application file for complete search history.

(56) References Cited

U.S. PATENT DOCUMENTS

| | | |
|---|---|---|
| 7,184,437 B1 | 2/2007 | Cole |
| 8,050,559 B2 | 11/2011 | Sindhu |
| 8,111,612 B2 * | 2/2012 | Dziong ............... H04L 12/4637 370/218 |
| 9,369,371 B2 * | 6/2016 | Filsfils .................... H04L 43/50 |
| 2002/0112072 A1 * | 8/2002 | Jain ......................... H04L 45/00 709/239 |
| 2005/0111351 A1 * | 5/2005 | Shen ....................... H04L 45/02 370/217 |
| 2006/0159009 A1 * | 7/2006 | Kim ........................ H04L 12/18 370/216 |
| 2007/0036072 A1 * | 2/2007 | Raj ......................... H04L 45/00 370/225 |

(Continued)

OTHER PUBLICATIONS

Aggarwal et al., "MPLS Upstream Label Assignment and Context-Specific Label Space," Network Working Group, rfc 5331, Standards Track, Aug. 2008, 14 pp.

(Continued)

*Primary Examiner* — Dustin Nguyen
(74) *Attorney, Agent, or Firm* — Shumaker & Sieffert, P.A.

(57) ABSTRACT

Techniques are described for providing node protection in a Source Packet Routing in Networking (SPRING) network. In some examples, a first network device, responsive to detecting a configuration request to provide node protection to a second network device that is adjacent to the first network device: generate at least one context table; configure at least one forwarding entry that indicates: a primary path between the first network device and a third network device, and a backup path, based at least in part on the at least one context table, between the first network device and the third network device that bypasses the second network device; while the second network device has not failed, forward network packets to the third network device using the primary path; and responsive to determining that the second network device has failed, forward network packets to the third network device using the backup path.

21 Claims, 6 Drawing Sheets

(56) References Cited

U.S. PATENT DOCUMENTS

2007/0091794 A1* 4/2007 Filsfils .................... H04L 12/66
370/228
2016/0173366 A1* 6/2016 Saad ...................... H04L 45/22
370/218

OTHER PUBLICATIONS

Andersson et al., "LDP Specification," Network Working Group, rfc 3036, Standards Track, Jan. 2001, 133 pp.
Andersson et al., "LDP Specification," Network Working Group, rfc 5036, Standards Track, Oct. 2007, 136 pp.
Callon, "Use of OSI IS-IS for Routing in TCP/IP and Dual Environments," Network Working Group, rfc 1195, Dec. 1990, 80 pp.
Filsfils et al., "Segment Routing with MPLS Data Plane," draft-filsfils-spring-segment-routing-mpls-03, Network Working Group, Internet Draft, Standards Track, Jul. 2014, 14 pp.
Filsfils et al., "Segment Routing Architecture," draft-filsfils-spring-segment-routing-04, Network Working Group, Internet Draft, Standards Track, Jul. 2014, 18 pp.
Filsfils et al., "Segment Routing Use Cases," draft-filsfils-spring-segment-routing-use-cases-00, Network Working Group, Internet Draft, Standards Track, Mar. 2014, 37 pp.
Gredler et al., "BGP Link-State Extensions for Segment Routing," draft-gredler-bgp-ls-segment-routing-extensions-00, Inter-Domain Routing Internet Draft, Standards Track, Feb. 2014, 12 pp.
Moy, "OSPF Version 2," Network Working Group, rfc 2328, Standards Track, Apr. 1998, 204 pp.
Previdi et al., "IPv6 Segment Routing Header (SRH)," draft-previdi-6man-segment-routing-header-02, Network Working Group, Standards Track, Jul. 2014, 24 pp.
Previdi et al., "IS-IS Extensions for Segment Routing," draft-ietf-isis-segment-routing-extensions-02, IS-IS for IP Internets Internet Draft, Standards Track, Jun. 2014, 32 pp.
Previdi et al., "Segment Routing Egress Peer Engineering BGPLS Extensions," draft-previdi-idr-bgpls-segment-routing-epe-00, Network Working Group, Standards Track, May 2014, 13 pp.
Previdi et al., "SPRING Problem Statement and Requirements," draft-ietf-spring-problem-statement-01, Network Working Group, Informational, Jun. 2014, 18 pp.
Psenak et al., "OSPF Extensions for Segment Routing," draft-psenak-ospf-segment-routing-extensions-05, Open Shortest Path First IGP Internet Draft, Standards Track, Jun. 2014, 31 pp.
Psenak et al., "OSPFv3 Extensions for Segment Routing," draft-psenak-ospf-segment-routing-ospfv3-extension-02, Open Shortest Path First IGP Internet Draft, Standards Track, Jul. 2014, 28 pp.

* cited by examiner

NODE PROTECTION FOR STACKED LABELS

TECHNICAL FIELD

The invention relates to computer networks and, more specifically, to forwarding network traffic within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as an interior gateway protocol (IGP). An interior gateway protocol may be a distance-vector protocol or a link state protocol. With a typical link state routing protocol, the routers exchange information related to available interfaces, metrics and other variables associated with links between network devices. This allows the routers to each construct a complete topology or map of the network. Some examples of link state protocols include the Open Shortest Path First (OSPF) protocol and the Intermediate-System to Intermediate System (IS-IS) protocol.

In Source Packet Routing in Networking (SPRING), an explicitly routed Multiprotocol Label Switching (MPLS) Label Switched Path (LSP) can be considered as an ordered list of adjacency segments. Each adjacency segment is identified by an "Adjacency Segment Identifier", referred to as an adj-SID. A shortest path MPLS LSP may be a segment that terminates on a node and is called "Node Segment Identifier" or node-SID. Segment routing extensions for ISIS and OSPF protocols specify how a router advertises adj-SIDs or node-SIDs. For MPLS data plane, an adj-SID may simply be an MPLS label. A node that desires to explicitly route a packet can attach a stack of MPLS labels to that packet, each label representing an adj-SID or a node-SID. In some instances, it may not be possible to determine a node-protecting backup path for packets with multi-label stacks at the time of installing a route for a one-hop tunnel that is based on an adjacency segment.

SUMMARY

In general, techniques are described for providing node protection in a Source Packet Routing in Networking (SPRING) network. For instance, a first router may provide node protection for a second router in a SPRING network by redirecting network traffic to bypass the second router if the second router is unable to forward network packets. To redirect network traffic, the first router may generate context tables for protected nodes, such as the second router, that are adjacent the first router. The context table for the second router may include a backup path that bypasses the second router altogether.

In some examples, the first router computes the backup path as a shortest path to a router that is downstream from the second router and adjacent to the second router, where the shortest path does not include the second router for which node protection is provided by the first router. Based on the computed shortest path, the first router may determine a backup label stack that corresponds to one or more adjacency- and/or node-segments that comprise the shortest path. In this way, the first router may determine which label stack or label-switched path the second router would have used to forward the network packet and generate an alternative, backup label stack to forward the network packet on the backup path that does not include the second network device.

The first router may configure one or more of its forwarding structures to forward network packets using a primary path that includes the second network device while the second network device is able to forward network packets, and use the backup path when the second network device is unable to forward network packets. Accordingly, the first router, in response to detecting a failure of the second network device, may apply the backup label stack to network packets in order to bypass the second network device.

In some examples, a method includes: responsive to detecting a configuration request at a first network device to provide node protection to a second network device that is adjacent to the first network device: generating, by the first network device, at least one context table, wherein the at least one context table corresponds to the second network device; configuring, at a forwarding unit of the first network device, at least one forwarding entry that indicates: a primary path between the first network device and a third network device that includes the second network device, and a backup path, based at least in part on the at least one context table, between the first network device and the third network device that bypasses the second network device; while the second network device has not failed, forwarding, by the first network device and based on the at least one forwarding entry, network packets to the third network device using the primary path; and responsive to determining that the second network device has failed, forwarding by the first network device and based on the at least one forwarding entry, network packets to the third network device using the backup path that is based at least in part on the at least one context table.

In some examples, a first network device includes: at least one processor; at least one module operable by the at least one processor to: responsive to detecting a configuration request at the first network device to provide node protection to a second network device that is adjacent to the first network device: generate at least one context table, wherein the at least one context table corresponds to the second network device; configure, at a forwarding unit of the first network device, at least one forwarding entry that indicates: a primary path between the first network device and a third network device that includes the second network device, and a backup path, based at least in part on the at least one context table, between the first network device and the third network device that bypasses the second network device; while the second network device has not failed, forward, based on the at least one forwarding entry, network packets to the third network device using the primary path; and responsive to determining that the second network device has failed, forward, based on the at least one forwarding entry, network packets to the third network device using the backup path that is based at least in part on the at least one context table.

A computer-readable medium comprising instructions for causing at least one programmable processor of a first network device to: responsive to detecting a configuration request at the first network device to provide node protection to a second network device that is adjacent to the first network device: generate at least one context table, wherein the at least one context table corresponds to the second network device; configure, at a forwarding unit of the first network device, at least one forwarding entry that indicates: a primary path between the first network device and a third network device that includes the second network device, and a backup path, based at least in part on the at least one context table, between the first network device and the third network device that bypasses the second network device; while the second network device has not failed, forward, based on the at least one forwarding entry, network packets to the third network device using the primary path; and responsive to determining that the second network device has failed, forward, based on the at least one forwarding entry, network packets to the third network device using the backup path that is based at least in part on the at least one context table.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
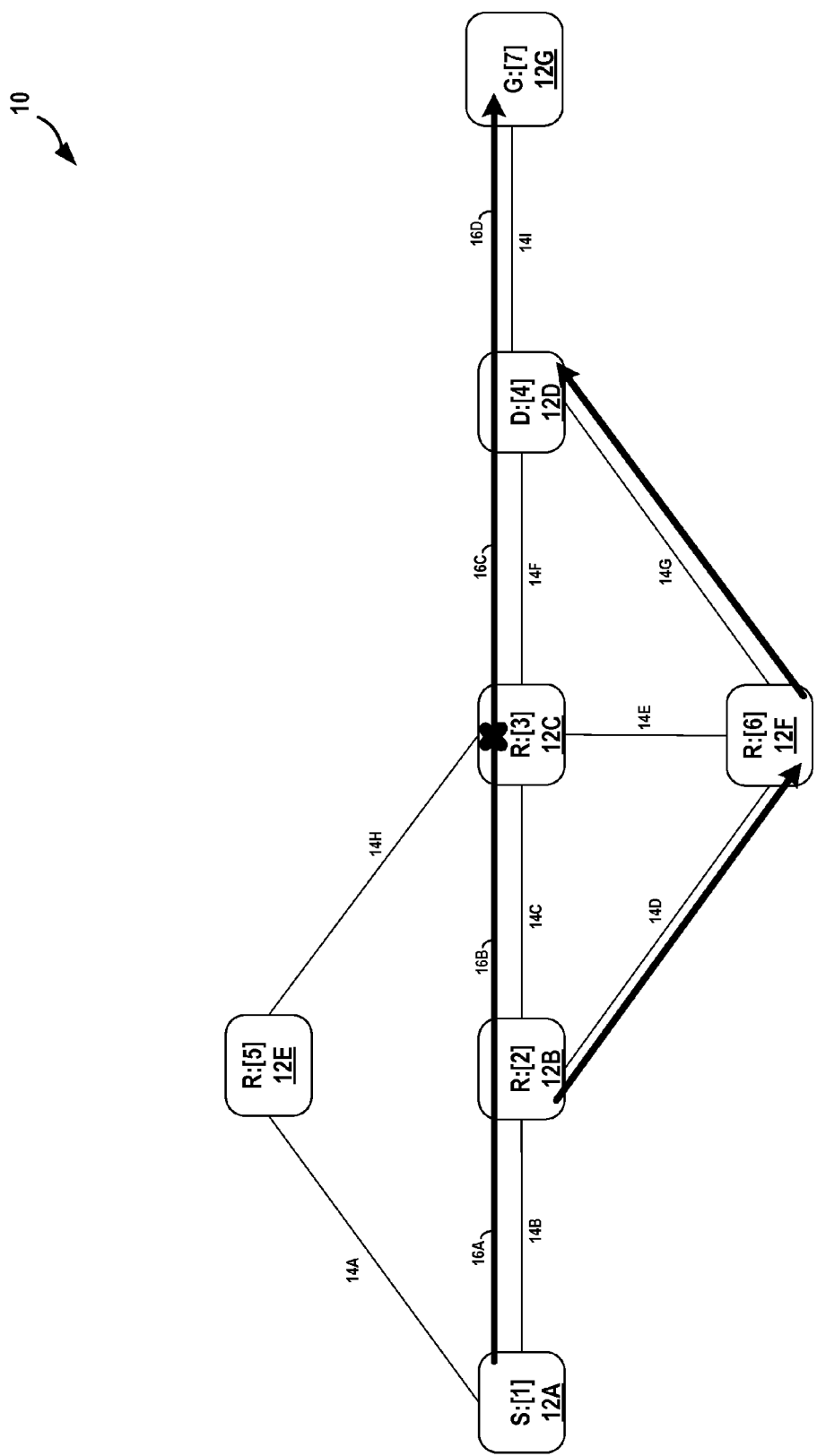
FIG. 1 is a block diagram illustrating an example system for providing node protection in a Source Packet Routing in Networking (SPRING) network, in accordance with techniques of the disclosure.

FIG. 1 is a block diagram illustrating an example system for providing node protection in a Source Packet Routing in Networking (SPRING) network, in accordance with techniques of the disclosure. FIG. 1 illustrates an example network 10 including routers 12A-12F (collectively, "routers 12") configured to forward traffic using IGP-distributed labels. Throughout this disclosure "router" and "node" may be used interchangeably. As shown in FIG. 1, each of routers 12 may be interconnected by one or more communication links 14A-14H (collectively, "links 14"). Each of links 14 may provide, as non-limiting examples, a 10- or 100-gigabit, physical connection. Communication links 14, generally, may be any wired or wireless links by which network packets traverse between two routers.

In the example of FIG. 1, some of routers 12 may be source routers that operate to ingress or otherwise inject or source network packets into network 10. An example of a source router may be router 12A. Some of routers 12 may be destination routers that operate to egress or otherwise drain network packets out of network 10. An example of destination routers may include router 12D and 12G. Some of routers 12 may be transit routers that forward traffic to other routers within network 10, and are not source or destination routers. Examples of transit routers include routers 12B, 12C, 12E, and 12F.

In some example, source routers and destination routers may be coupled to one or more customer devices (not shown) with access to network 10. While discussed herein with respect to a particular network device, i.e., a router, any one or more of routers 12 may represent any network device that routes, switches, bridges or otherwise forwards network traffic directed to or originating from the network. For example, any one or more of routers 12 may each represent, in certain instances, one or more of a switch, a hub, a bridge device (e.g., an Ethernet bridge), or any other L2 network device and, in some instances, L3 network devices capable of performing L2 functionality.

Routers 12 in network 10 each maintain routing information that describes available routes through network 10. Upon receiving an incoming packet, each of the routers examines information within the packet and forwards the packet in accordance with the routing information. In order to maintain an accurate representation of network 10, routers 12 exchange routing information, e.g., bandwidth availability of links, in accordance with a defined routing protocol, such as an Interior Gateway Protocol (IGP). For example, each of the routers may use a link-state routing protocol, such as the Open Shortest Path First (OSPF) protocol or the Intermediate-System to Intermediate System (IS-IS) protocol, to exchange link-state routing information to learn the topology of network 10. Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Each of routers 12 may use a Source Packet Routing in Networking (SPRING) protocol to forward network packets within network 10. Further details regarding SPRING are found in (1) "Segment Routing Architecture," IETF draft: draft-filsfils-spring-segment-routing-04, Jul. 3, 2014; and "SPRING Problem Statement and Requirements," and (2) IETF draft: draft-ietf-spring-problem-statement-01, Jun. 26, 2014, and (3) "Segment Routing with MPLS data plane," IETF draft: draft-filsfils-spring-segment-routing-mpls-03, Aug. 1, 2014, the entire contents of which are incorporated by reference herein.

In general, SPRING provides segment routing (SR) within an IGP domain that allows routers to advertise single or multi-hop label switched paths LSPs within the IGP domain. For segment routing, the "path" information is disseminated between the routers as part of the IGP link state information for the domain. Routers are able to steer packets through a controlled set of segments defining a path by prepending an SR header (e.g., a label) to the packets. Segment routing allows routers to enforce a flow through any topological path and service chain while maintaining per-flow state only at the ingress node to the SR domain. One advantage of segment routing is that the segment routing architecture can be directly applied to the MPLS data plane, in some examples, with no change in the forwarding plane.

In this example, routers 12, that are included in an SR domain, exchange labels in accordance with the SPRING protocol. One or more routers may be configured in an SR domain, which provides a realm of administrative autonomy, authority or control for routing packets according to the SPRING protocol. In the example of FIG. 1, each of routers 12 in network 10 is included in the same SR domain.

Each of routers 12 operates as a label switching router (LSR) that distributes labels to neighboring LSRs within network 10 to support SPRING forwarding along routed paths within network 10. SPRING includes multiple different label types including "adjacency" labels and "node" labels. To forward a packet through network 10, one or more of routers 12 may push (and pop) one or more labels in a label stack (e.g., a "segment list") that is applied to the packet as it is forwarded through the network. The label stack may encode the topological and service source route of the packet.

Different types of SPRING labels are further described hereinafter. An adjacency label may have a local semantic to a particular SR node, such as one of routers 12. In particular, an adjacency label steers traffic onto an adjacency (e.g., communication link and/or interface) or set of adjacencies of the advertising router. To use an adjacency label, a router may initially assign the adjacency label to a particular adjacency and advertise it to other routers in the SR domain using ISIS or OSPF. When an ingress router forwards a packet using the adjacency label, the packet may be forced, by the ingress router, to use the adjacency for the ingress router associated with the adjacency label. In this way, adjacency labels may be used to establish one-hop tunnels within network 10.

A node label, by contrast, may have a global semantic within an SR domain. That is, each of routers 12 may be assigned a defined node label range that is unique to each respective router within the SR domain. An operator of network 10 may ensure unique allocation of the different node label ranges from a global range to different routers. In addition to a node label range, each particular router may also have a specific node identifier that uniquely identifies the particular router in the SR domain. Each respective router may advertise its respective node identifier and node label range to other routers in the SR domain using ISIS or OSPF.

Based on routes determined using equal-cost multi-path routing (ECMP) and/or best-path routing, each of routers 12 may configure its forwarding state to push and pop adjacency and/or node labels (corresponding to other nodes in the network) onto packets in order to forward such packets using the determined route to the destination. For instance, each of routers 12 may perform path selection using topology information learned by way of IGP to compute a shortest path within network 10 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

In SPRING, an explicitly routed MPLS LSP can be considered as an ordered list of adjacency segments. Each adjacency segment is identified by an "Adjacency Segment Identifier", hereafter called adj-SID, which may be an adjacency label as described above. A shortest path MPLS LSP may be a segment that terminates on a node and is called "Node Segment Identifier" or node-SID. Segment routing extensions for ISIS and OSPF protocols specify how a router advertises adjacency labels. For an MPLS data plane, adj-SID or adjacency label may simply be an MPLS label. A node that desires to explicitly route a packet can attach a stack of adjacency labels to that packet, each label representing an adj-SID.

FIG. 1 illustrates the use of adjacency labels to forward packets through network 10. For purposes of this disclosure, L(X, Y, i) denotes the adjacency label advertised by node X to reach node Y over interface i. For simplicity in the example of FIG. 1, the i is omitted and the notation L(X, Y) is used because there is only one interface between the nodes in the example topology. Similarly, an interface between two nodes is represented as/(X, Y). As noted above, since adjacency labels in MPLS data plane are MPLS labels, L(X,Y) may represent the MPLS label that node X advertised to reach node Y. N(X, Y) may represent the MPLS label (or "node label") corresponding to the node-SID from node X to node Y.

In the example of FIG. 1, the node numbers (or "node identifiers") are used for illustration purposes to reference or otherwise identify labels for nodes in network 10. The node numbers are indicated by square brackets and follow as: router 12A has node identifier 1, router 12B has node identifier 2, router 12C has node identifier 3, router 12D has node identifier 4, router 12E has node identifier 5, router 12F has node identifier 6, and router 12G has node identifier 7. For example, the unidirectional link from node 12A (node identifier 1) to node 12B (node identifier 2) is 102. For purposes of illustration a '0' is used to designate the unidirectional link from node 12A (node identifier 1) to node 12B (node identifier 2); however, any suitable character or symbol may be used. The following are example adjacency segments identified for adjacency identifiers in FIG. 1 with respect to each of routers 12A-12F:

Router 12A: L(1, 2)=102, L(1, 5)=105
Router 12B: L(2, 1)=201, L(2, 3)=203, L(2, 6)=206
Router 12C: L(3, 2)=302, L(3, 4)=304, L(3, 5)=305, L(3, 6)=306
Router 12D: L(4, 3)=403, L(4, 6)=406
Router 12E: L(5, 1)=501, L(5, 3)=503
Router 12F: L(6, 2)=602, L(6, 3)=603, L(6, 4)=604

Accordingly, if router 12A explicitly routes traffic via router 12B and 12C to router 12D using adjacency labels, router 12A may be configured to push labels L(3,4) and L(2,3) in that order and send the traffic on link 14B. The forwarding entry in the data plane for router 12A may be illustrated as the following:

Router 12A: Dest→Push [203, 304], out via I(1, 2)

Router 12B may have the following forwarding entry for label 203 to forward traffic to router 12C:

Router 12B: 203→Pop, out via I(2, 3)

When the packet reaches router 12C, router 12C pops the label 304 and forwards to router 12D:

Router 12C: 304→Pop, out via I(3, 4)

In this way, packets are forwarded through the network according to a path 16 that includes routers 12A, 12B, 12C, 12D and 12G using adjacency labels as described above. Three sub-paths 16A, 16B, 16C and 16D collectively form path 16 that includes routers 12A, 12B, 12C, 12D and 12G.

In some examples, one or more of routers 12 may provide link protection and/or node protection for links and nodes in the network. Taking router 12B as an example, router 12B may provide link protection for link 14C. If link 14C fails, router 12B may re-direct network traffic using an alternative link, such as link 14D. For instance, if router 12B forwards network traffic to router 12D and link 14C fails, router 12B may re-direct network traffic to link 14D, through which router 12D is reachable. To illustrate further, router 12B has link protection available for interface I(2,3), then the forwarding entry in router 12B would be of the form shown here:

```
Router 12B: 203 - -+- - > Pop, out via I (2, 3)
                   |
                   +- - > Swap [603], out via I (2, 6)
```

The first out-segment entry with I(2, 3) is the primary path and the second entry with I(2, 6) is the backup path. The backup path routes the packet to router 12C through [I(2, 6), I(6, 3)] avoiding the protected link I(2, 3). In other words, after popping the label L(2,3), router 12B may swap the top label L(2, 3) with L(6, 3) and forward the packet to router 12F. In this way, router 12B may re-direct traffic to router 12F and then to router 12C to bypass failed link 14C by configuring its data plane.

In contrast to link protection, node protection provides protection for routers that fail or are otherwise unable to forward traffic, rather than links. For instance, router 12B may provide node protection for router 12C, such that if router 12C fails, router 12B may re-direct network traffic to bypass router 12C altogether. That is, router 12B may determine that router 12C has failed or is otherwise unable to forward traffic, and re-direct network traffic. Unlike link protection, in which router 12B may swap top label L(2, 3) with L(6, 3) to reach router 12C while bypassing the failed link 14C, router 12B may need to determine an alternative path that does not include router 12C at all.

If a network packet received by router 12B and destined for router 12G includes a stack of adjacency labels that were generated by router 12A based on an assumption that a particular path 16 existed through network 12, router 12B cannot merely swap the top label L(2, 3) because in addition to determining an alternative path bypassing router 12C, router 12B should also remove the label L(3, 4) that would have been used by 12C to direct traffic over link 14F. That is, the stack of adjacency labels may include labels for downstream routers lower in the stack that are no longer applicable or usable in a backup path that does not include router 12C. If a downstream router on the backup path processes such a label associated with a router not in the backup path, and the forwarding plane of the downstream router is not configured for the label, the downstream router may drop the packet. In other words, to provide node protection for router 12C when forwarding packets with SPRING, router 12B may need to determine a different label stack that router 12B can apply if router 12C is bypassed altogether. If router 12B re-directs a network packet responsive to router 12C failing, without updating or otherwise modifying adjacency labels of the label stack that are not included in a backup path, the packet may be dropped.

To further illustrate, it may not be possible to determine the node-protecting backup out-segment for L(2, 3) at route installation time. For example, if router 12B receives a label stack [L(2, 3), L(3, 4)], then a backup out-segment (or "backup path") should direct the traffic to router 12D. On the other hand, if the received label stack is [L(2, 3), L(3, 6)], then the backup out-segment should direct the traffic to router 12F. That is, where the backup path should direct the packet depends on the inner label that is present below the top label L(2, 3).

Accordingly, techniques of the disclosure enable router 12B to determine a different node-protecting backup out-segment that router 12B can use if router 12C is bypassed altogether. In other words, router 12B may implement techniques of this disclosure to determine which label stack or label-switched path router 12C would have used to forward the network packet to router 12D en route to router 12G. By determining the label stack or label-switched path that router 12C would have applied, router 12B may generate an alternative label stack to forward the network packet on a backup path to destination router 12G.

In order to determine a different label stack that router 12B can apply if router 12C is bypassed altogether, router 12B may maintain a context table for each router that is adjacent to router 12B. A context table, maintained by router 12B, may include data that contains one or more adjacency labels provided by an adjacent router to other routers that are adjacent to the adjacent router. The context table may also contain node labels provided by the adjacent router to all other routers in the network. As such, in some examples, a context table maintained by router 12B may include data indicating labels allocated by a router that is adjacent to router 12B. For instance, router 12B may maintain context tables for each of routers 12A, 12F, and 12C. A context table for router 12C, that is maintained by router 12B, may include one or more labels that router 12C applies to forward network packets to other routers adjacent to router 12C. In some examples, a router adjacent to router 12B may be a next hop router that is a single hop from router 12B, such as routers 12A, 12C, and 12F in FIG. 1. Although described as a table, router 12B may use any suitable data structure, such as a map, list, database, or hash table, to name only a few examples, to store the information that is described as included in a context table.

In accordance with techniques of the disclosure, each router of network 10 may generate a context table for each of its adjacent routers. For instance, router 12B may generate a context table for each of routers 12A, 12C, and 12F. In some examples, router 12B may use a protocol, such as IGP, to exchange label information with other routers in network 10. Router 12B may receive label and route information that corresponds to each label from router 12C. As an example, router 12C may forward network packets with label L(3,4) to router 12D. Accordingly, router 12C may use IGP to send the label L(3,4) and in some examples route information, such as a route definition for a route from router 12C to 12D, to router 12B. Router 12B may store the label L(3,4) and the route information in a context table for router 12C, and/or generate entries in the context table based on the label and route information for the label. In this way, router 12B may determine the labels that its adjacent routers apply to forward packets in network 10.

To provide node protection for router 12C, router 12B may generate entries in the context table for router 12C that enable router 12B to re-direct network packets using a backup path that does not include router 12C. For instance, router 12B may determine that router 12C would apply the label L(3,4) to network packets destined for router 12D. Router 12B may further determine, based on routing information, that router 12D is reachable by router 12B via router 12F. Accordingly, router 12B may generate an entry in its context table for router 12C that indicates, if label L(3,4) is included in label stack for a packet received by router 12B, router 12B will swap label L(3,4) with a label L(6,4) and forward the packet to router 12F, which in turn forwards the packet to router 12D. By determining both the labels that router 12C applies in order to forward packets to its adjacent routers and the adjacent routers themselves, router 12B may generate entries in its context table for router 12C that enable router 12B to apply an updated label stack to a packet and bypass router 12C altogether in the event of a node failure.

As such, router 12B may, in accordance with techniques of this disclosure, configure its forwarding structures to use a primary path while router 12C is operational, but in response determining a node failure at router 12C, use a backup path based on one or more entries its context table for router 12C. In this way, if router 12B determines a node failure at router 12C, router 12B may use one or more entries of its context table for router 12C and re-direct network packets to bypass router 12C.

If router 12B receives a network packet, while router 12C is operational, from router 12A that includes a label stack [L(2,3), L(3,4)] to explicitly route traffic to router 12D via routers 12B and 12C, router 12B may forward the network packet using the primary path configured in its forwarding structures by popping label L(2,3) and forwarding the packet out of interface I(2,3). If, however, router 12B later determines that router 12C has failed, router 12B may, upon receiving a subsequent network packet from router 12A that also includes a label stack [L(2,3), L(3,4)], determine a backup path based on an entry in the context table for router 12C that is maintained by router 12B. In particular, router 12B may pop label L(2,3), and because router 12C has failed, determine an entry in the context table for router 12C based on the L(3,4) that is now at the top of the label stack. Because router 12B previously determined, when generating the context table entry for L(3,4), that router 12D is reachable by router 12B via router 12F, router 12B will swap label L(3,4) with a label L(6,4) and forward the packet to router 12F. In this way, the network packet will reach router 12F with label stack L(6,4), which router 12F will forward to router 12D after popping label L(6,4). In this way, by generating a context table entry for a backup path to router 12F, router 12B may bypass router 12C altogether, although a network packet may include a label stack to explicitly route traffic to router 12D traversing routers 12B and 12C. As further described in this disclosure, the backup path specified in a context table entry may, in some examples, indicate an LSP to reach a destination, such an RSVP LSP from router 12B to router 12D in the example described above. Techniques of the disclosure are further described with respect to FIGS. 2-6.

Figure 2:
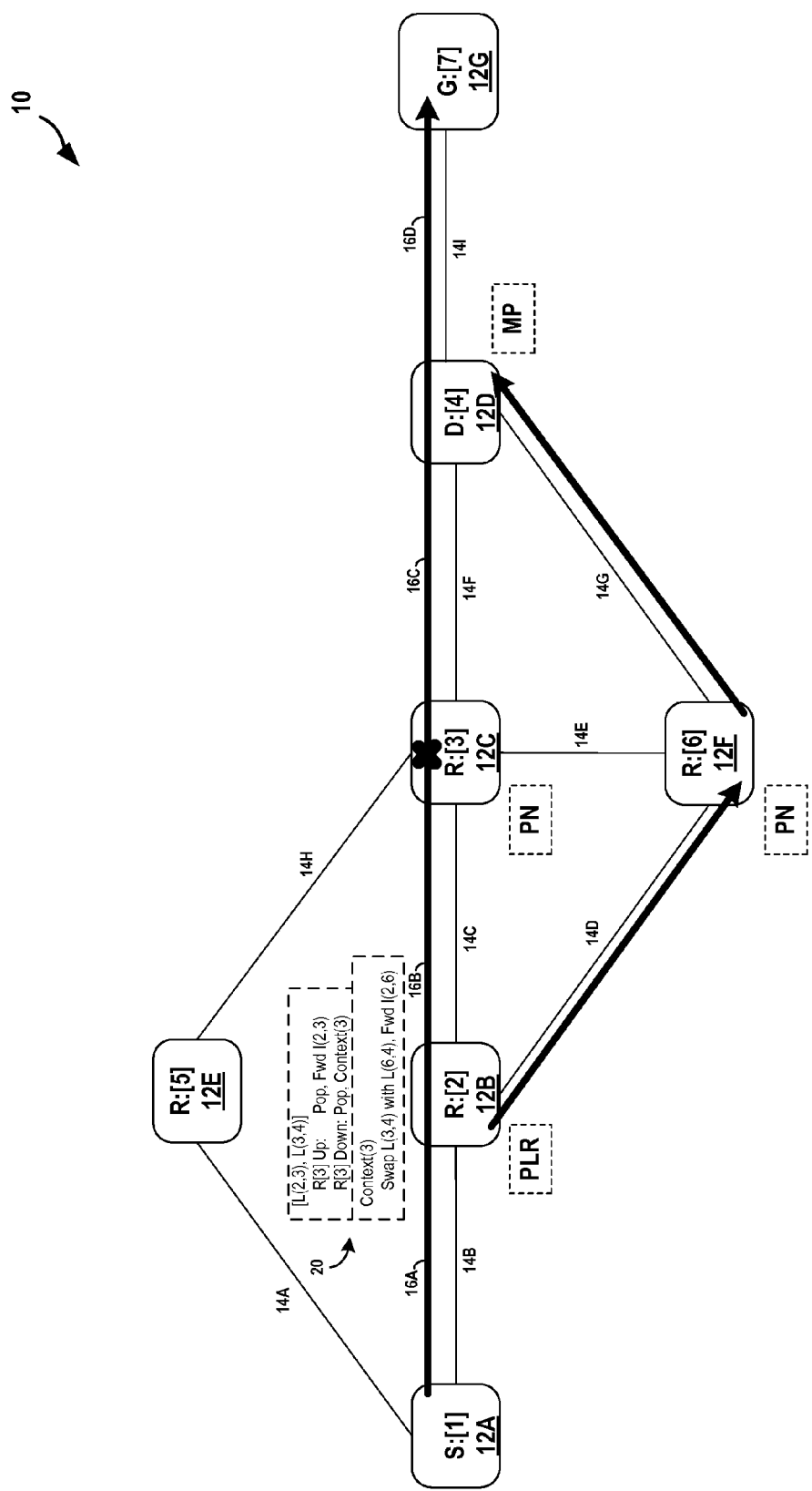
FIG. 2 is a block diagram illustrating further details of the example system of FIG. 1 for providing node protection in a Source Packet Routing in Networking (SPRING) network, in accordance with techniques of the disclosure.

FIG. 2 is a block diagram illustrating further details of the example system of FIG. 1 for providing node protection in a Source Packet Routing in Networking (SPRING) network, in accordance with techniques of the disclosure. In the example of FIG. 2, routers 12 may include a point of local repair (PLR), which may be a source, destination or transit router. For purposes of FIG. 2, routers 12 include router 12B as a PLR. A PLR may be a router that initiates the repair action upon failure. Routers 12 may also include one or more protected nodes (PNs) with respect to the PLR, such as router 12C and router 12F. A PN may be a router for which router 12B provides node protection. As an example, router 12B may provide node protection for adjacent routers 12A, 12C and 12F. In some examples, routers 12 also include one or more merge points (MPs), such as router 12D. An MP may be a router where the backup path terminates. The backup path may be an RSVP LSP, or an LSP based on a SPRING label stack generated from a context table, in accordance with techniques of this disclosure. In the example of FIG. 2, if router 12B offered node protection to adj-SID I(2, 3) used by router 12B to reach router 12C, then the merge point would be router 12D if the next label in the label stack is adj-SID I(3, 4) used by router 12C to reach router 12D.

As described in FIG. 1, the techniques of this disclosure uses the context label space defined in RFC 5331 entitled "MPLS Upstream Label Assignment and Context-Specific Label Space" to construct context tables for routers adjacent to a protected node. For instance, router 12B may construct context tables for routers adjacent to protected nodes, such as router 12A, 12C and router 12F. PLR router 12B constructs a backup out-segment using the following techniques. PLR router 12B performs such techniques to construct a backup out-segment for each protected node that it has an adjacency with, such as PN router 12C and PN router 12F. The techniques to construct a backup out-segment are described with respect to PN router 12C for example purposes, although router PLR 12B would also perform such techniques for router 12F and 12A, in accordance with techniques of the disclosure. Further details regarding in RFC 5331 are found in "MPLS Upstream Label Assignment and Context-Specific Label Space," RFC 5331, August 2008, the entire contents of which are incorporated by reference herein.

To construct a backup out-segment for PN router 12C, PLR router 12B may determine whether it has already constructed a context table corresponding to PN router 12C. If a context table for PN router 12C does not exist, PLR router 12B may construct the context table. To generate the context table for PN router 12C, PLR router 12B may receive from PN router 12C, via IGP, a set of labels that PN router 12C applies to outgoing network packets that it forwards in network 10. For instance, PN router 12C may apply the following labels to forward network traffic to routers 12D, 12E, and 12F, respectively: L(3,4), L(3,5), and L(3,6). PLR router 12B may store an entry for each of labels L(3,4), L(3,5), and L(3,6) in the context table for PN router 12C. As further described with respect to FIG. 2, PLR router 12B will generate an out-segment for each respective label in the context table. Each out-segment specifies a forwarding action that PLR router 12B performs based on a particular label stored in the context table. PLR router 12B will use the context table as a backup lookup table for a route L(PLR, PN), if the interface I(PLR, PN) fails.

In the example of FIG. 2, PLR router 12B generates a backup out-segment for PN router 12C for forwarding a label stack with another adjacency label as next label using the following techniques. PLR router 12B may determine or otherwise be configured to treat router 12C as a PN. In response to determining that router 12C is a PN, PLR router 12B may generate a merge point list (MP-LIST) that includes each router adjacent to PN router 12C. For instance, PLR router 12B may generate an MP-LIST that includes routers 12B, 12D, 12E, and 12F that are each adjacent to PN router 12C. PLR router 12B may then remove itself from the MP-LIST, such that the MP-LIST includes routers 12D, 12E, and 12F.

PLR router 12B may also generate and maintain a graph that represents the topology of network 10. In particular, PLR router 12B may generate a group in which nodes of the graph represent routers in network 10, and adjacencies between the nodes represents links between routers of network 10. PLR router 12B may generate and update this graph based on the topology of network 10 using one or more networking protocols, through which PLR router 12B exchanges routing information with other routers of network 10. PLR router 12B may prune or otherwise remove the node that represents PN router 12C from the graph because PLR router 12B will determine a path that PLR router 12B can use if PN router 12C is not operational or otherwise unavailable.

Upon pruning PN router 12C from the graph, PLR router 12B may perform the following techniques for each merge point (MP) in the MP-LIST. PLR router 12B may select a MP and compute a Constrained Shorted Path First (CSPF) path from PLR router 12B to the selected MP using the graph that does not include PN router 12C. Although CSPF is described for example purposes, any suitable shortest path algorithm may be used by PLR router 12B. The computed CSPF path will be a path that leads to the selected MP while avoiding PN router 12C. For purposes of this disclosure, this CSPF path may be referred to as BackupPath(PLR, MP, PN).

To illustrate this computation of BackupPath(PLR, MP, PN), PLR router 12B may select MP router 12D as the selected MP from MP-LIST. PLR router 12B may compute a CSPF path from PLR router 12B to MP router 12D that does not include PN router 12C (because PN router 12C was pruned from the graph). The CSPF path may include router 12F to bypass PN router 12C. Accordingly, PLR router 12B may determine a BackupPath(2, 4, 3) that includes router 12F.

PLR router 12B may construct a label stack corresponding to BackupPath(PLR, MP, PN) by concatenating the adj-SIDs, or adjacencies labels, of the BackupPath. For instance, if BackupPath(2, 4, 3), originating at router 12B, includes routers 12F and 12D, then router 12B may generate a label stack that includes label L(6,4). For purposes of illustration, the generated label stack in FIG. 2 includes a single label L(6,4); however, if multiple hops existed between PLR router 12B and MP router 12D, the label stack would include multiple labels, each label corresponding to a respective adjacency from one hop to the next hop. The stack generated by PLR router 12B may be referred to as BackupLabelStack(PLR, MP, PN), in this disclosure.

PLR router 12B may associate BackupLabelStack(PLR, MP, PN) with the entry in the context table for label L(PN, MP), that PLR router 12B received from PN router 12C via IGP. For instance, PLR router 12B may associate BackupLabelStack(2, 4, 3) with the entry in the context table for label L(3, 4), that PLR router 12B received from PN router 12C via IGP. To associate BackupLabelStack(PLR, MP, PN) with the entry in the context table for label L(PN, MP), PLR router 12B may associate the following actions with label L(PN, MP): (1) pop L(PN, MP) and (2) push BackupLabelStack(PLR, MP, PN). Stated another way, PLR router 12B may swap L(PN, MP) with BackupLabelStack(PLR, MP, PN). To associate the actions with label L(PN, MP), PLR router 12B may determine an entry in the context table for PN router 12C that includes label L(PN, MP), and store data in the entry that represents or otherwise defines the actions (1) pop L(PN, MP) and (2) push BackupLabelStack(PLR, MP, PN).

PLR router 12B may perform the computations as described above to determine each BackupPath for a PN. For instance, PLR router 12B may generate a context table for PN router 12C, according to the techniques as described above, that includes the following:

Context(3):
Label Action
304→Swap [604], out via 1(2, 6)
305→Swap [105], out via 1(2, 1)
306→Pop, out via I(2, 6)

Each entry may include a label and an action. As another example, PLR router 12B may also generate a context table for PN router 12F, according to the techniques as described above, that includes the following:

Context(6):
603→Pop, out via I(2, 3)
604→Swap [304], out via I(2, 3)

In some examples, PLR router 12B may alternatively signal a BackupPath(PLR, MP, PN) using a signaling protocol supporting explicit routing (e.g. RSVP-TE or CR-LDP). For instance, PLR router 12B may signal or have already pre-configured an RSVP LSP from PLR router 12B to MP router 12D that includes router 12F. In such examples, PLR router 12B may associate an action with label L(3,4) in the context table for router 12C that pops label L(3,4) and pushes an MPLS label for an RSVP-TE tunnel from PLR router 12B to router 12F. Upon performing a lookup based on the MPLS label, router 12F (which is also configured for the RSVP LSP from PLR router 12B to router 12F), forwards the packet to MP router 12D, which is included in the RSPV LSP from PLR router 12B to MP router 12D.

PLR router 12B may configure its forwarding structures to use a primary path while router 12C is operational, but in response determining a node failure at router 12C, use a BackupPath from one or more entries its context table for router 12C. In this way, if router 12B determines a node failure at router 12C, router 12B may use one or more entries of its context table for router 12C and re-direct network packets in order to bypass router 12C. Router 12B may configure its forwarding structures 20 in the following way for BackupPath(2, 4, 3):

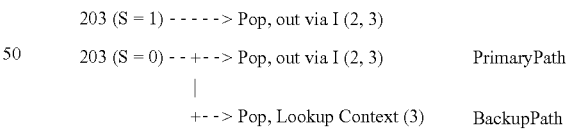

In some examples, forwarding entries marked as (S=1) are matched by MPLS traffic with only one label, and entries marked by (S=0) are matched by MPLS traffic with more than one label in the stack. The forwarding structures of PLR router 12B may include a Main adj-SID table that stores the forwarding entries described above with the PrimaryPath and BackupPath.

If PLR router 12B receives a network packet, while PN router 12C is operational, from router 12A that includes a label stack [L(2,3), L(3,4)] to explicitly route traffic to MP router 12D via routers 12B and 12C, PLR router 12B may forward the network packet using the PrimaryPath configured in its forwarding structures by popping label L(2,3) and forwarding the packet out of interface I(2,3). If, however, PLR router 12B later determines that PN router 12C has failed, PLR router 12B may, upon receiving a subsequent network packet from router 12A that also includes a label stack [L(2,3), L(3,4)], determine a BackupPath based on an entry in the context table for PN router 12C that is maintained by PLR router 12B. In particular, router 12B may pop label L(2,3), and because router 12C has failed, determine an entry in the context table for router 12C based on the L(3,4) that is now at the top of the label stack. Because router 12B previously determined, when generating the context table entry for L(3,4), that router 12D is reachable via BackupPath (2, 4, 3), router 12B swaps label L(3,4) with a label L(6,4) (e.g., swap L(PN, MP) with BackupLabelStack(PLR, MP, PN)) and forward the packet to router 12F out of interface I(2,6). In this way, the network packet will reach router 12F with label stack L(6, 4), which router 12F will forward to MP router 12D after popping label L(6,4). In this way, by generating a context table entry for a BackupPath(2, 4, 3) using router 12F, router 12B may bypass router 12C altogether, although a network packet may include a label stack to explicitly route traffic to router 12D traversing routers 12B and 12C.

Figure 3:
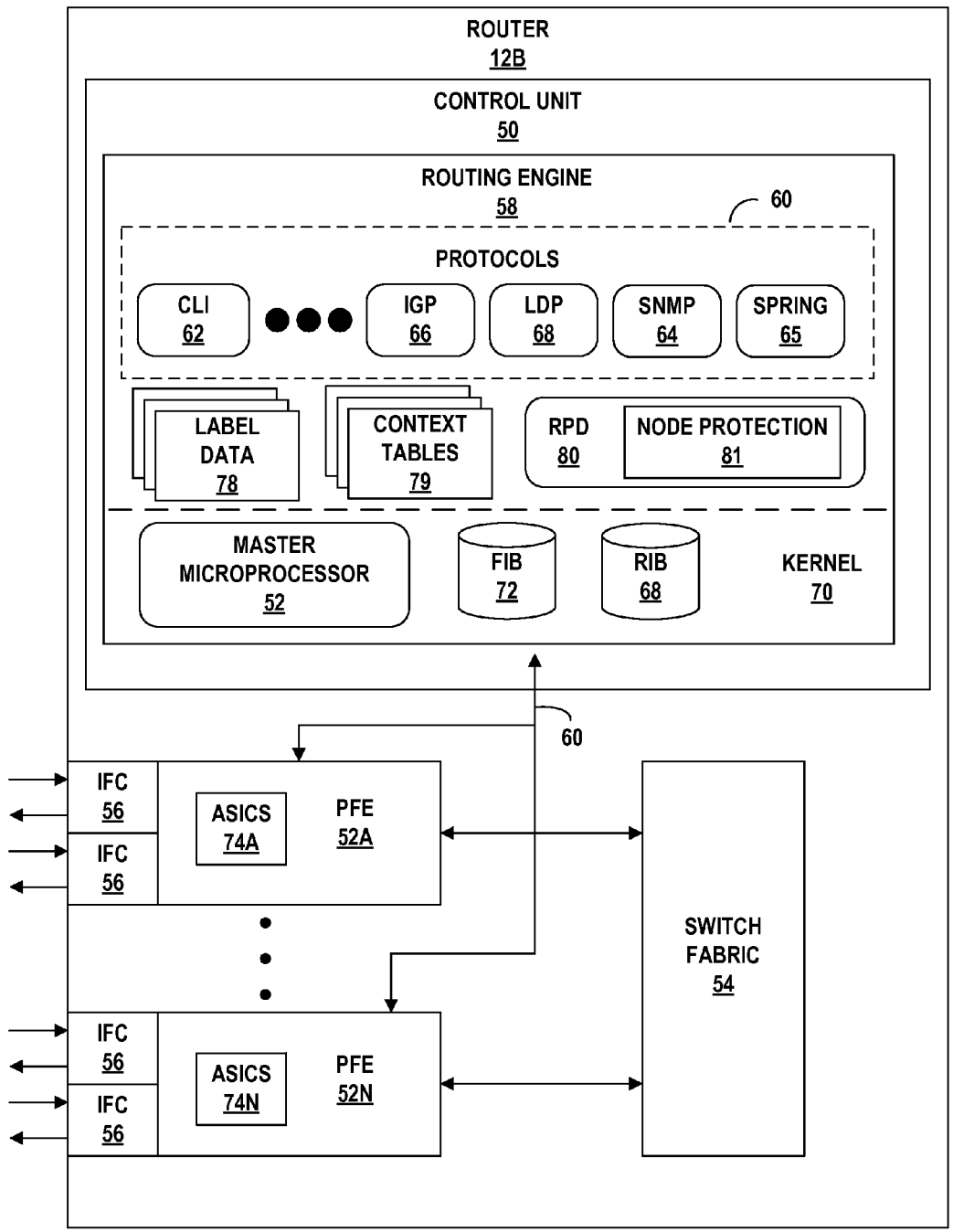
FIG. 3 is a block diagram illustrating an exemplary router capable of providing node protection in a Source Packet Routing in Networking (SPRING) network, in accordance with techniques of this disclosure.

FIG. 3 is a block diagram illustrating an exemplary router capable of providing node protection in a Source Packet Routing in Networking (SPRING) network, in accordance with techniques of this disclosure. Router 12B may comprise any router in a network, such as network 10. For example, router 12B may comprise a source router, a PLR router, a destination router, or any transit router illustrated in FIGS. 1-2. For purposes of illustration, router 12B is described as a PLR router.

In the example of FIG. 3, router 12B includes control unit 50 in which routing engine 26 provides control plane functionality for router 12B. Router 12B also includes a plurality of packet-forwarding engines 52A-52N ("PFEs 52" or "forwarding units 52") and a switch fabric 54 that collectively provide a data plane for forwarding network traffic. PFEs 52 receive and send data packets via interface cards 56 ("IFCs 56"). In other embodiments, each of PFEs 52 may comprise more or fewer IFCs. Although not shown, PFEs 52 may each comprise a central processing unit (CPU) and a memory. In this example, routing engine 58 is connected to each of PFEs 52 by a dedicated internal communication link 60. For example, dedicated link 60 may comprise a Gigabit Ethernet connection. Switch fabric 54 provides a high-speed interconnect for forwarding incoming data packets between PFEs 52 for transmission over a network. U.S. patent application Ser. No. 11/832,342, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. patent application Ser. No. 11/832,342 are incorporated herein by reference.

Routing engine 58 provides an operating environment for execution of various protocols 60 that may comprise software processes having instructions executed by a computing environment. As described in further detail below, protocols 60 provide control plane functions for storing network topology in the form of routing tables or other structures, executing routing protocols to communicate with peer routing devices and maintain and update the routing tables, and providing management interface(s) to allow user access and configuration of router 12B. In this respect, routing engine 58 represents hardware or a combination of hardware and software that implements with routing protocol daemon 62 ("RPD 80"). RPD 80 may use protocols 60 to exchange routing information, stored in a routing information base 68 ("RIB 68"), with other routers. RIB 68 may include information defining a topology of a network. RPD 80 may resolve the topology defined by routing information in RIB 68 to select or determine one or more routes through the network. RPD 80 may then generate forwarding information base (FIB) 72 and update forwarding plane 63 with routes from FIB 72, where PFEs 52 store these routes in respective FIBs.

Control unit 50 provides an operating environment for routing engine 58 and may be implemented solely in software, or hardware, or may be implemented as a combination of software, hardware or firmware. For example, control unit 50 may include one or more processors which execute software instructions. In that case, routing engine 58 may include various software modules or daemons (e.g., one or more routing protocol processes, user interfaces and the like), and control unit 50 may include a computer-readable storage medium, such as computer memory or hard disk, for storing executable instructions.

Command line interface daemon 62 ("CLI 62") provides an interface by which an administrator or other management entity may modify the configuration of router 12B using text-based commands. Simple Network Management Protocol daemon 64 ("SNMP 64") comprises an SNMP agent that receives SNMP commands from a management entity to set and retrieve configuration and management information for router 12B. Using CLI 62 and SNMP 64, management entities may enable/disable and configure services, install routes, enable/disable and configure rate limiters, and configure interfaces, for example.

One or more routing protocols, such as IGP 66, maintains routing information in the form of routing information base (RIB) 68 that describes a topology of a network, and derives a forwarding information base (FIB) 72 in accordance with the routing information. In general, the routing information represents the overall topology of the network. IGP 66 interacts with kernel 70 (e.g., by way of API calls) to update routing information base (RIB) 68 based on routing protocol messages received by router 12B. RIB 68 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 72 is generated based on selection of certain routes within the network and maps packet key information (e.g., destination information and other select information from a packet header) to one or more specific next hops and ultimately to one or more specific output interface ports of IFCs 56. Routing engine 58 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

LDP 68 executes the Label Distribution Protocol to exchange MPLS labels for enabling label-based packet forwarding as described herein. In one example, LDP 68 operates in conformance with specifications set forth in Andersson, L., et al, "LDP Specification", RFC 3036, January 2001, and/or Andersson, L., et al, "LDP Specification", RFC 5036, October 2007, the entire contents of each being incorporated herein by reference.

SPRING 65 executes the Source Packet Routing in Networking (SPRING) protocol. Using SPRING 65, router 12B forwards packets using node and adjacency labels as described with respect to FIGS. 1-2. In some examples, SPRING 65 implements the SPRING protocol in conformance with one or more of the following specifications, the entire contents of which are incorporated herein by reference:

(1) "SPRING Problem Statement and Requirements," IETF draft: draft-ietf-spring-problem-statement-01, Jun. 26, 2014
(2) "Segment Routing Architecture," IETF draft: draft-filsfils-spring-segment-routing-04, Jul. 3, 2014
(3) "Segment Routing with MPLS data plane," IETF draft: draft-filsfils-spring-segment-routing-mpls-03, Aug. 1, 2014
(4) "Segment Routing Use Cases," IETF draft: draft-filsfils-spring-segment-routing-use-cases-00, Mar. 27, 2014
(5) "IS-IS Extensions for Segment Routing," IETF draft: draft-ietf-isis-segment-routing-extensions-02, Jun. 18, 2014
(6) "OSPF Extensions for Segment Routing," IETF draft: draft-psenak-ospf-segment-routing-extensions-05, Jun. 5, 2014
(7) "OSPFv3 Extensions for Segment Routing," IETF draft: draft-psenak-ospf-segment-routing-ospfv3-extension-02, Jul. 2, 2014
(8) "BGP Link-State extensions for Segment Routing," IETF draft: draft-gredler-idr-bgp-ls-segment-routing-extension-00, Aug. 18, 2014
(9) "Segment Routing Egress Peer Engineering BGPLS Extensions," IETF draft: draft-previdi-idr-bgpls-segment-routing-epe-00, May 26, 2014
(10) "IPv6 Segment Routing Header (SRH)," IETF draft: draft-previdi-6man-segment-routing-header-02, Jul. 3, 2014.

Although techniques of the disclosure are described with respect to MPLS labels in some instances for example purposes, techniques of the disclosure may be similarly applied using IPv6 headers.

Routing engine 58 communicates data representative of a software copy of the FIB 72 into each of PFEs 52 to control forwarding of traffic within the data plane. This allows the software FIB stored in memory (e.g., RAM) in each of PFEs 52 to be updated without degrading packet-forwarding performance of router 12B. In some instances, routing engine 58 may derive separate and different software FIBs for each respective PFEs 52. In addition, one or more of PFEs 52 include application-specific integrated circuits (ASICs 74) that PFEs 52 program with a hardware-copy of the FIB based on the software FIBs (i.e., hardware versions of the software FIBs) copied to each respective PFE 52.

For example, kernel 70 executes on master microprocessor 52 and may comprise, for example, a UNIX operating system derivative such as Linux or Berkeley Software Distribution (BSD). Kernel 70 processes kernel calls from IPG 66, LDP 68, and SPRING 65 to generate forwarding information in the form of FIB 72 based on the network topology represented in RIB 68, i.e., performs route resolution and path selection. Typically, kernel 70 generates FIB 72 in the form of radix or other lookup trees to map packet information (e.g., header information having destination information and/or a label stack) to next hops and ultimately to interface ports of interface cards associated with respective PFEs 52. FIB 72 may associate, for example, network destinations with specific next hops and corresponding IFCs 56. For MPLS-related traffic forwarding, FIB 72 stores label information that includes an incoming label, an outgoing label, and a next hop for a packet.

Master microprocessor 52 executing kernel 70 programs PFEs 52 to install copies of the FIB 72. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 74 are microcode-controlled chipsets (i.e., forwarding circuits) programmably configured by a slave microprocessor executing on each of PFEs 52. When forwarding packets, control logic with each ASIC 74 traverses the forwarding information (FIB 72) received from routing engine 58 and, upon reaching a FIB entry for the packet (e.g., a leaf node), microcode-implemented control logic 56 automatically selects a forwarding next hop and processes the packets in accordance with the operations defined within the next hop. In this way, ASICs 74 of PFEs 52 process packets by performing a series of operations on each packet over respective internal packet forwarding paths as the packets traverse the internal architecture of router 12B. Operations may be performed, for example, on each packet based on any of a corresponding ingress interface, an ingress PFE 52, an egress PFE 52, an egress interface or other components of router 12B to which the packet is directed prior to egress, such as one or more service cards. PFEs 52 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 52 arranges forwarding structures as next hop data that can be chained together as a series of "hops" along an internal packet forwarding path for the network device. In many instances, the forwarding structures perform lookup operations within internal memory of ASICs 74, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 74 determines the manner in which a packet is forwarded or otherwise processed by PFEs 52 from its input interface on one of IFCs 56 to its output interface on one of IFCs 56.

In some examples, RPD 80 may include a node protection module 81 ("NP module 81") that implements node protection techniques of this disclosure. Although shown as included within RPD 80 for example purposes of FIG. 3, in some examples, NP module 81 may not be included within RPD 80. NP module 81 may detect a request to provide node protection for router 12C. For instance, CLI 62 and/or SNMP 64 may receive a request to provide the node protection as user input from an administrator or as part of one or more automated operations. In some examples, the request to provide node protection may come from another computing device that is separate from router 12B. In some examples, the request may define which routers for which router 12B will provide node protection and/or parameters that specify node protection and/or the type of node protection.

In response to detecting the request for node protection, NP module 81 may construct context tables 79 for protected nodes, such as router 12C and router 12F, if such context tables have not been previously generated. Although shown separately in FIG. 3, context tables 79 may be included in FIB 72 in some examples. NP module 81 may construct a backup out-segment using the following techniques described below. NP module 81 performs such techniques to construct a backup out-segment for each protected node that router 12B has an adjacency with, such as PN router 12C and PN router 12F. The techniques to construct a backup out-segment are described with respect to PN router 12C for example purposes, although router NP module 81 would also perform such techniques for router 12F and router 12A, in accordance with techniques of the disclosure.

To construct a backup out-segment for PN router 12C, NP module 81 may determine whether it has already constructed a context table in context tables 79 that corresponds to PN router 12C. If a context table for PN router 12C does not exist in context tables 79, NP module 81 may construct the context table. To generate the context table for PN router 12C, NP module 81 may receive from PN router 12C, via IGP, a set of labels that PN router 12C applies to outgoing network packets that it forwards in network 10. NP module 81 may store the labels as label data 78. Although shown separately, label data 78 may be stored in RIB 68 and/or FIB 72.

To further illustrate, PN router 12C may apply the following labels to forward network traffic to routers 12D, 12E, and 12F: L(3,4), L(3,5), and L(3,6). NP module 81 may store an entry for each of labels L(3, 4), L(3, 5), and L(3, 6) in the context table for PN router 12C of context tables 79. As further described with respect to FIG. 2, NP module 81 will generate an out-segment for each respective label in the context table. Each out-segment may be backup out-segment that specifies one or more forwarding actions that PLR router 12B performs based on a particular label stored in the context table. PLR router 12B will use the context table as a backup lookup table for a route L(PLR, PN), if the interface I(PLR, PN) fails.

In the example of FIG. 3, NP module 81 generates a backup out-segment for PN router 12C for forwarding a label stack with another adjacency label as next label using the following techniques. NP module 81 may determine, based on data indicated in the request to provide node protection, that router 12B will treat router 12C as a protected node. In response to determining that router 12C is a PN, NP module 81 may generate a merge point list (MP-LIST) that includes each router adjacent to PN router 12C. For instance, NP module 81 may generate an MP-LIST that includes routers 12B, 12D, 12E, and 12F that are each adjacent to PLR router 12B. NP module 81 may then remove router 12B from the MP-LIST, such that the MP-LIST includes routers 12D, 12E, and 12F.

RPD 80 may generate and maintain a graph that represents the topology of network 10. In particular, RPD 80 may generate a group in which nodes of the graph represent routers in network 10, and adjacencies between the nodes represents links between routers of network 10. RPD 80 may generate and update this graph based on the topology of network 10 using one or more networking protocols, through which PLR router 12B exchanges routing information with other routers of network 10. NP module 81 may use or create a copy of the graph maintained by RPD 80 and prune or otherwise remove the node that represents PN router 12C from the graph because NP module 81 will determine a path that PLR router 12B can use if PN router 12C is not operational or otherwise unavailable.

Upon pruning PN router 12C from the graph, NP module 81 may perform the following techniques for each merge point (MP) in the MP-LIST. NP module 81 may select a MP and compute a Constrained Shorted Path First (CSPF) path from PLR router 12B to the selected MP using the graph that does not include PN router 12C. Although CSPF is described for example purposes, any suitable shortest path algorithm may be used by PLR router 12B. The computed CSPF path will be a path that leads to the selected MP while avoiding PN router 12C. For purposes of this disclosure, this CSPF path may be referred to as BackupPath(PLR, MP, PN).

To illustrate this computation of BackupPath(PLR, MP, PN), NP module 81 may select MP router 12D as the selected MP from MP-LIST. NP module 81 may compute a CSPF path from PLR router 12B to MP router 12D that does not include PN router 12C (because PN router 12C was pruned from the graph). The CSPF path may include router 12F to bypass PN router 12C. Accordingly, NP module 81 may determine a BackupPath(2, 4, 3) that includes router 12F.

NP module 81 may construct a label stack corresponding to BackupPath(PLR, MP, PN) by concatenating the adj-SIDs, or adjacencies labels, of the BackupPath. For instance, if BackupPath(2, 4, 3), originating at router 12B, includes routers 12F and 12D, then NP module 81 may generate a label stack that includes label L(6,4). The stack generated by NP module 81 may be referred to as BackupLabelStack (PLR, MP, PN), in this disclosure.

NP module 81 may associate BackupLabelStack(PLR, MP, PN) with the entry for label L(PN, MP) in the context table for router 12C, that PLR router 12B received from PN router 12C via IGP. For instance, NP module 81 may associate BackupLabelStack(2, 4, 3) with the entry in the context table for label L(3, 4), that PLR router 12B received from PN router 12C via IGP. To associate BackupLabel-Stack(PLR, MP, PN) with the entry in the context table for label L(PN, MP), NP module 81 may associate the following actions with label L(PN, MP): (1) pop L(PN, MP) and (2) push BackupLabelStack(PLR, MP, PN). Stated another way, PLR router 12B may swap L(PN, MP) with BackupLabel-Stack(PLR, MP, PN). To associate the actions with label L(PN, MP), NP module 81 may determine an entry in the context table for PN router 12C that includes label L(PN, MP), and store data in the entry that represents or otherwise defines the actions (1) pop L(PN, MP) and (2) push BackupLabelStack(PLR, MP, PN).

NP module 81 may perform the computations as described above to determine each BackupPath for a PN. Each entry may include a label and an action. As described in FIG. 2, in some examples, NP module 81 may alternatively signal a BackupPath(PLR, MP, PN) using a signaling protocol supporting explicit routing (e.g. RSVP-TE or CR-LDP). For instance, NP module 81 may signal or have already pre-configured an RSVP-TE LSP from PLR router 12B to MP router 12D that includes router 12F. In such examples, NP module 81 may associate an action with label L(3,4) in the context table for router 12C that pops label L(3,4) and pushes an MPLS label for an RSVP-TE tunnel from PLR router 12B to PLR router 12F. Upon performing a lookup based on the MPLS label, PLR router 12F (which is also configured for the RSVP-TE LSP from PLR router 12B to PLR router 12F), forwards the packet to MP router 12D, which is included in the RSVP-TE LSP from PLR router 12B to MP router 12D.

RPD 80, based on the above described techniques of NP module 81 and context tables 79, may configure forwarding structures included in FIB 72 to use a primary path while router 12C is operational, but in response determining a node failure at router 12C, use a BackupPath from one or more entries its context table for router 12C. In this way, if router 12B determines a node failure at router 12C, router 12C may use one or more entries of its context table for router 12C and re-direct network packets to bypass router 12C. In some examples, upon configuring FIB 72, RPD 80 may send data to or otherwise cause kernel 70 to configure one or more of ASICS 74 to forward network packets in accordance with the primary path while router 12C is operational and in accordance with the backup path if router 12C fails.

In the example of FIG. 3, PFE 52A may be communicatively coupled to router 12C. If PFE 52A receives a network packet, while PN router 12C is operational, from router 12A that includes a label stack [L(2,3), L(3,4)] to explicitly route traffic to MP router 12D via routers 12B and 12C, PFE 52A may forward the network packet using the PrimaryPath configured in its forwarding structures by popping label L(2,3) and forwarding the packet out of interface I(2,3).

If, PFE 52A later determines that PN router 12C has failed, PFE 52A may, upon receiving a subsequent network packet from router 12A that also includes a label stack [L(2,3), L(3,4)], determine a BackupPath based on an entry in the context table for PN router 12C that is maintained by PLR router 12B. In particular, PFE 52A may pop label L(2,3), and because router 12C has failed, determine an entry in the context table for router 12C based on the L(3,4) that is now at the top of the label stack. Because NP module 81 previously determined, when generating the context table entry for L(3,4), that router 12D is reachable via BackupPath (2, 4, 3), PFE 52A swaps label L(3,4) with a label L(6,4) (e.g., swap L(PN, MP) with BackupLabelStack(PLR, MP, PN)) and forward the packet to router 12F. In this way, the network packet will reach router 12F with label stack L(6, 4), which router 12F will forward to MP router 12D after popping label L(6,4). In this way, by generating a context table entry for a BackupPath(2, 4, 3) using router 12F, router 12B may bypass router 12C altogether, although a network packet may include a label stack to explicitly route traffic to router 12D traversing routers 12B and 12C.

In some examples, SPRING labels exchanged between routers in the same segment routing domain may include adjacency labels and node labels. As such, router 12B of FIG. 3 may provide node protection when a label stack of an incoming packet includes node labels. Such techniques are further described with respect to FIG. 3 herein and FIG. 6. If router 12B determines that the exchanged SPRING labels received from router 12C include one or more node labels, router 12B may generate a backup path that provides node protection if one or more labels of a label stack include node labels.

For example, NP module 81 may generate a destination node list (DN-LIST). To generate the DN-LIST, NP module 81 may determine, from the graph generated by RPD 80 that represents the topology of network 10, each destination router that is a drain for network packets of network 10 and/or a network based on a segment routing domain. A destination router that is a drain for network packets may egress packets out of network 10 and/or the segment routing domain that includes router 12B. For instance, NP module 81 may determine each router that, upon receiving a network packet, does not forward the network packet to another router in network 10 and/or the segment domain that includes router 12B, but instead forwards the network packet to a router or computing device of a different network and/or segment routing domain is a destination router.

NP module 81 may iterate through the DN-LIST to determine shortest paths that bypass router 12C. In some examples, NP module 81 selects a destination router from the DN-LIST. NP module 81 may determine if the destination node is the PLR router, e.g., router 12B. If the selected destination router is the PLR router (e.g., router 12B), NP module 81 may configure one or more of forwarding entries in FIB 72 to perform a lookup for packets based on the label-FIB entries for MPLS traffic destined to router 12B. If LDP module 68 is configured on router 12B, then LDP module 68 may have already set up one or more label-FIB entries in FIB 72. IGP module 66 may have already configured one or more of its forwarding entries on router 12B to perform a lookup for packets based on the IP-FIB entries in FIB 72 for IP traffic destined to router 12B. More generally, NP module 81 may configure one or more of its forwarding entries to perform a lookup for packets destined to router 12B based on one or more of router 12B's existing FIB entries of FIB 72 that define how to forward the network packets to a different network and/or segment routing domain.

If the selected destination router from the DN-LIST is not the PLR (e.g., is not router 12B), NP module 81 may determine the shortest path from PN router 12C to the selected destination node. To determine the shortest path, NP module 81 may use a Shortest-Path First (SPF) tree, based on a graph that it has generated and that represents the topology of network 10, with the PN router 12C as root. Any suitable SPF technique may be used to generate the SPF tree and determine the path. The resulting SPF tree yields the shortest path from PN router 12C to the selected destination in the network.

Upon determining the shortest path from router 12C to the selected destination router, NP module 81 may determine the Next Next Hop (NNH) from PLR router 12B. In some examples, the NNH is a router that is one hop away from router 12C and the first downstream router from router 12C en route to the selected destination router. Stated another way, the NNH router may be the next hop after router 12C on the determined shortest path to the destination router. For instance, if router 12G were the selected destination router, router 12D may be a NNH for the shortest path from router 12C to router 12G.

NP module 81 may determine whether the determined NNH is the PLR router. For instance, NP module 81 may determine whether router 12B is the determined NNH. If the NNH is the PLR router (e.g., router 12B), NP module 81 may use the backup path from router 12B's L-FIB, which may be a part of FIB 72 in some examples. This will result in Node-SID's in the context table being SPF-forwarded by PLR router 12B after the failure occurs. In other words, router 12B may use the L-FIB entry to the destination router, that already bypasses router 12C because router 12B is the next hop in shortest path from router 12C to the destination router, to forward network packets to the destination router in the event that router 12C has failed. Accordingly, NP module 81 may use the shortest path determined and configured in its L-FIB that avoids router 12C as the backup path for Node-SID's in the context table for PN router 12C.

Figure 6:
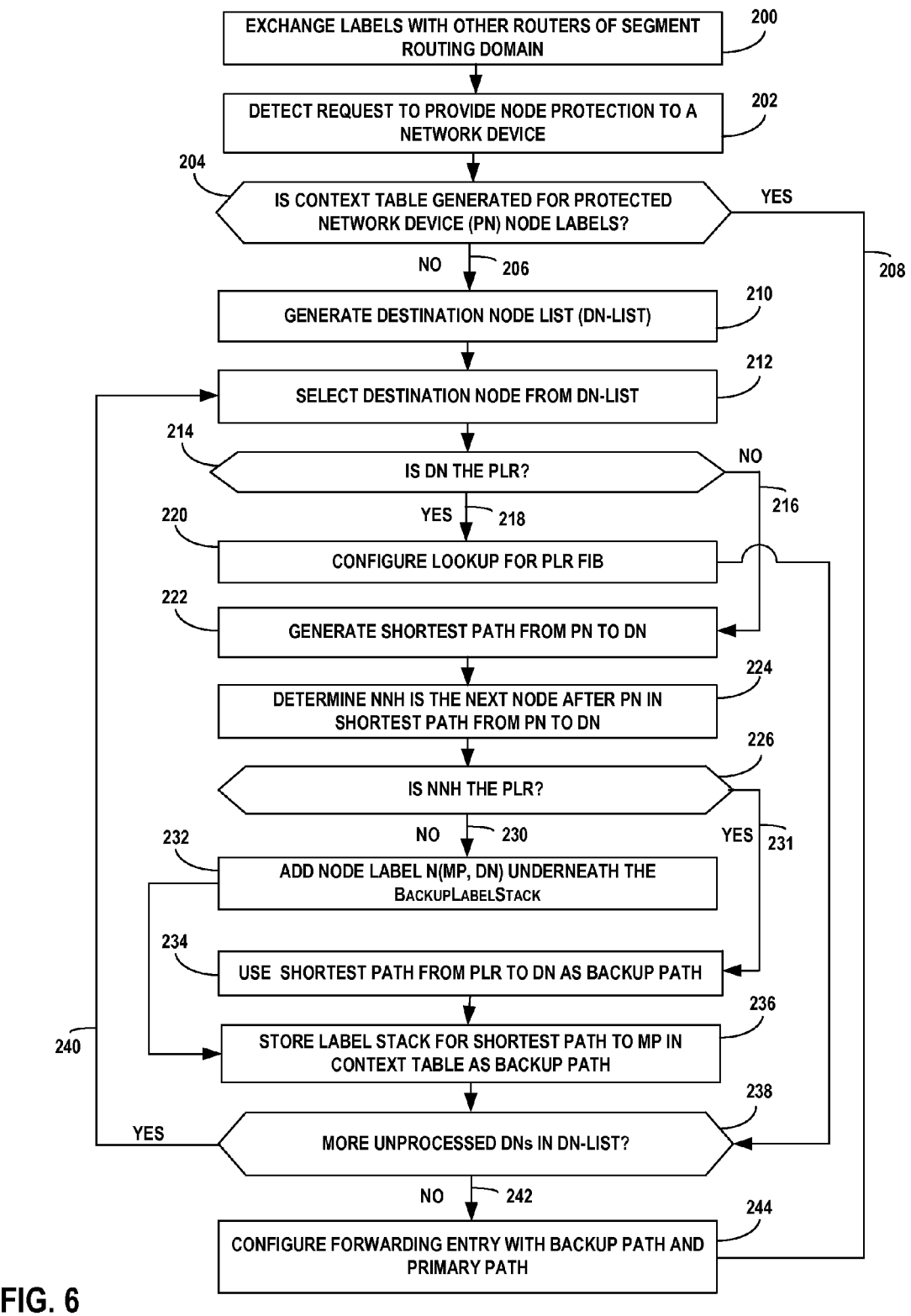
FIG. 6 is a flowchart that illustrates example operations of a router of FIGS. 1-3 that implements techniques for generating a backup path for a label stack with one or more node labels in a Source Packet Routing in Networking (SPRING) network, in accordance with techniques of the disclosure.

If the NNH is not the PLR router (e.g., router 12B), then the NNH is the merge point for N(PN, DN) as described in FIG. 3 and further in FIG. 6. Accordingly, NP module 81 may retrieve the node label N(MP, DN), and configures the entry in the context table for router 12C that corresponds to label N(PN, DN), to insert node label N(MP, DN) underneath the BackupLabelStack(PLR, MP, PN). In other words, NP module 81 configures the entry of its context table for router 12C that corresponds to node label N(PN, DN), to apply a label stack of BackupLabelStack(PLR, MP, PN) on top of N(MP, DN) as the backup path for N(PN, DN). This resulting label stack may be referred to as BackupLabelStack(PLR, DN, PN) in this disclosure. NP module 81 may associate or otherwise store BackupLabelStack(PLR, DN, PN) as the backup path for MPLS route N(PN, DN) in the context table for PN router 12C with following actions in order: (1) Pop N(PN, DN) and (2) Push BackupLabelStack (PLR, DN, PN). Stated another way, PLR router 12B may swap N(PN, DN) with BackupLabelStack(PLR, DN, PN). In this way, NP module 81 includes a backup path for a packet with node label N(PN, DN) that bypasses router 12C using label stack BackupLabelStack(PLR, DN, PN). Accordingly, router 12B may provide node protection for router 12C when node labels are used to forward network packets. It should be noted that if the incoming packet contains only adjacency labels and if the NP module 81 installs adjacency labels of PN router, then the DN-LIST degenerates to MP-LIST.

Router 12B may be determine if there are additional merge points in the DN-LIST that have not yet been selected from the list for processing in accordance with the above techniques. If additional destination nodes remain to be processed, NP module 81 selects a next destination node, and performs the techniques as described above for a selected destination node. If no additional merge points remain to be processed, RPD 80 may configure its forwarding entries to forward network packets using the context tables 79 and the labels received from other routers in the same segment routing domain.

RPD 80, based on the above described techniques of NP module 81 and context tables 79, may configure forwarding structures included in FIB 72 to use a primary path while router 12C is operational, but in response determining a node failure at router 12C, use a BackupLabelStack(PLR, DN, PN) for a backup path from one or more entries its context table for router 12C, if an incoming packet includes a node label for a protected node, such as router 12C. In this way, if router 12B determines a node failure at router 12C, router 12C may use one or more entries of its context table for router 12C and re-direct network packets to bypass router 12C. In some examples, upon configuring FIB 72, RPD 80 may send data to or otherwise cause kernel 70 to configure one or more of ASICS 74 to forward network packets in accordance with the primary path while router 12C is operational and in accordance with the backup path if router 12C fails.

The architecture of router 12B illustrated in FIG. 3 is shown for exemplary purposes only. This disclosure is not limited to this architecture. In other examples, router 12B may be configured in a variety of ways. In one example, some of the functionally of control unit 50 may be distributed within IFCs 56. Control unit 82 may be implemented solely in software, or hardware, or may be implemented as a combination of software, hardware, or firmware. For example, control unit 50 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 50 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
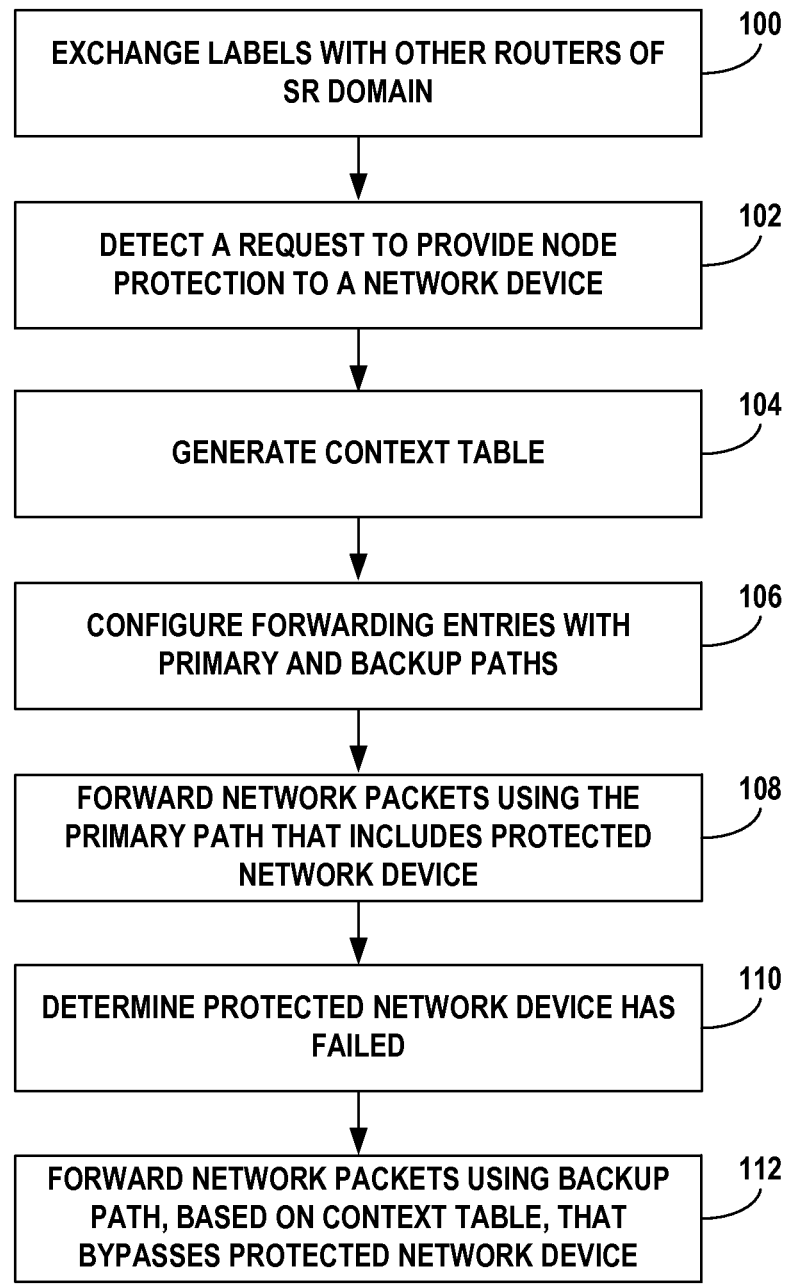
FIG. 4 is a flowchart that illustrates example operations of a router of FIGS. 1-3 that implements techniques for providing node protection in a Source Packet Routing in Networking (SPRING) network, in accordance with techniques of the disclosure.

FIG. 4 is a flowchart that illustrates example operations of a router of FIGS. 1-3 that implements techniques for providing node protection in a Source Packet Routing in Networking (SPRING) network, in accordance with techniques of the disclosure. For purposes of illustration only, the example operations are described below within the context of router 12B, as shown in FIGS. 1-3. In the example of FIG. 4, router 12B may exchange SPRING labels with one or more routers of the same segment routing domain (100). In the examples of this disclosure, each of routers 12 is configured as part of the same segment routing domain. However, in other examples, one or more other routers and/or one or more of routers 12 may not be included in the same segment routing domain. In some examples, SPRING labels may include adjacency labels and node labels. Router 12B may use IGP to send its SPRING labels to one or more other routers in the same segment routing domain, and the one or more other routers may each send its SPRING labels to router 12B.

Router 12B may detect a configuration request to provide node protection to one or more of routers 12 (102). For instance, router 12B may receive data indicating the request as part of user input provided by an administrator. In some examples, router 12B may receive data indicating the request as part of one or more automated operations. In case, upon receiving the request, router 12B determine whether one or more context tables have already been generated by router 12B for a protected node, such as router 12C in the examples of this disclosure. As further shown in FIG. 5, if a context table has already been generated router 12B for router 12C with one or more backup paths, router 12B may forward network packets using a primary path, and/or backup path included in the context table maintained by router 12B.

In the example of FIG. 4, router 12B, in response to determining that no context table exists for the protected node, router 12B may generate a context table for the protected node (104). For example, router 12B, as further described in FIGS. 1-3 and 5-6, may generate a backup path that bypasses router 12C in the event that router 12C fails. In some examples, router 12B may create a Merge-Point List (MP-LIST) and determine a SPF path, for each merge point in the MP-LIST, from the router 12B to the merge point. Router 12B may generate a label stack corresponding to BackupPath(PLR,MP, PN) by concatenating the adj-SIDs, or adjacency labels, of the SPF path. As described in this disclosure, this label stack may be referred to as BackupLabelStack(PLR, MP, PN). Router 12B may associate BackupLabelStack(PLR, MP, PN) with a label for an MPLS router L(PN, MP) in an entry of the context table for router 12C. The entry of the context table may specify a set of actions, such as (1) Pop L(PN, MP) and (2) Push BackupLabelStack(PLR, MP, PN).

Upon generating the one or more context tables, router 12B may configure its forwarding entries to forward network packets using the context tables and the labels received from other routers in the same segment routing domain (106). In some examples, router 12B may configure a primary path, which includes router 12C, in its forwarding entries to initially forward network packets to a destination router 12D. Router 12B may also configure a backup path in its forwarding entries, based on the BackupLabelStack(PLR, MP, PN) configured in the context table for router 12C, that does not include router 12C.

Based on its forwarding entries, router 12B may initially forward network packets to the destination router 12D, while router 12C is operational (108) (e.g., while router 12C receives and forwards network packets to next hops and destinations). Router 12B may determine that router 12C has later failed (110). For instance, router 12C may experience any number of failures that prevent it from receiving and/or forwarding network packets, such as deadlock, power failure, hardware failure, and/or device resource exhaustion, to name only a few examples. In response to detecting the failure of the protected router 12C, router 12B may forward network packets using the backup path that was previously configured before the failure (112). In particular, router 12C may use the entries in the pre-generated context table for router 12C to re-route network traffic in a way that bypasses router 12C. For instance, router 12C may perform one or more actions indicated in the context table, such as popping a label L(PN, MP) and pushing BackupLabelStack(PLR, MP, PN) on the label stack of the packet. In this way, router 12B may provide node protection for other routers in network 10.

It should be noted, in accordance with techniques of the disclosure, that if there is change in network topology, even then the context table may need to re-generated either because one or more routers may be added or deleted from MP-LIST, or the shortest path obtained after pruning PN may change for one or more MP-LIST already computed.

Figure 5:
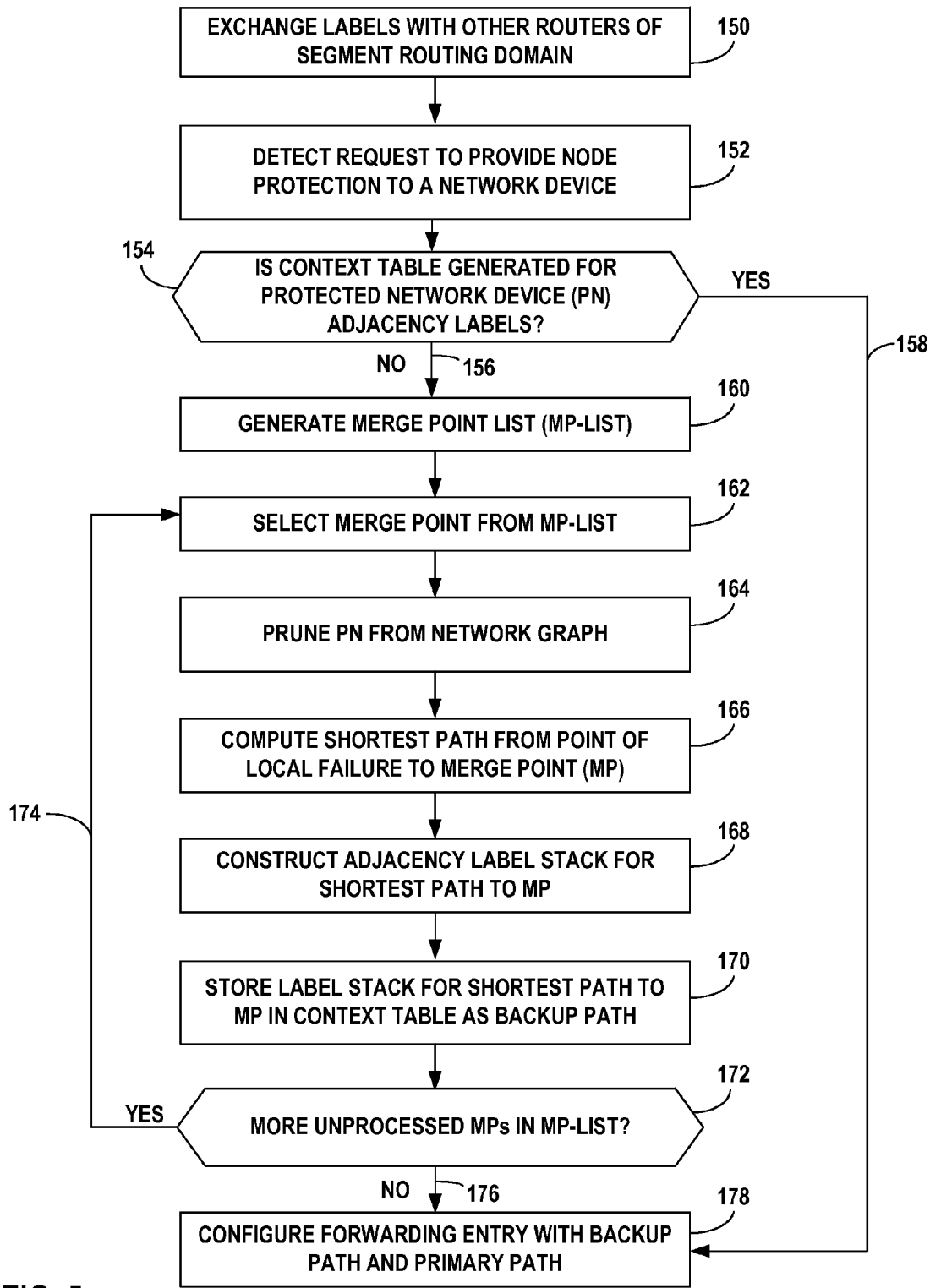
FIG. 5 is a flowchart that illustrates example operations of a router of FIGS. 1-3 that implements techniques for generating a backup path for a label stack with one or more adjacency labels in a Source Packet Routing in Networking (SPRING) network, in accordance with techniques of the disclosure.

FIG. 5 is a flowchart that illustrates example operations of a router of FIGS. 1-3 that implements techniques for generating a backup path for a label stack with one or more adjacency labels in a Source Packet Routing in Networking (SPRING) network, in accordance with techniques of the disclosure. For purposes of illustration only, the example operations are described below within the context of router 12B, as shown in FIGS. 1-3. In the example of FIG. 5, router 12B may exchange SPRING labels with one or more routers of the same segment routing domain (150). As previously described in FIG. 4, each of routers 12 may be configured as part of the same segment routing domain. However, in other examples, one or more other routers and/or one or more of routers 12 may not be included in the same segment routing domain. In some examples, SPRING labels may include adjacency labels and node labels. Router 12B may use IGP to send its SPRING labels to one or more other routers in the same segment routing domain, and the one or more other routers may each send its SPRING labels to router 12B.

Router 12B may detect a configuration request to provide node protection to one or more of routers 12 (152). For instance, router 12B may receive data indicating the request as part of user input provided by an administrator. In some examples, router 12B may receive data indicating the request as part of one or more automated operations. In case, upon receiving the request, router 12B determine whether one or more context tables have already been generated by router 12B for a protected node, such as router 12C in the examples of this disclosure. In some examples, router 12B may determine whether a context table has already been generated for router 12C (154).

If a context table has already been generated router 12B for router 12C with one or more backup paths (158), router 12B may configure its forwarding entries to forward network packets using the context tables and the labels received from other routers in the same segment routing domain (178). If, however, router 12B has not already generated a context table for router 12C with one or more backup paths (156), router 12B may generate one or more entries with backup paths in the context table for router 12C. In particular, router 12B may generate a Merge Point List (MP-LIST) (160). To generate the MP-LIST, router 12B may determine, from a graph that it has generated and that represents the topology of network 10, each router that is adjacent to router 12C. For instance, router 12B may determine each of routers 12 that is one hop away from router 12C.

Router 12B may iterate through the MP-LIST to determine shortest paths that bypass router 12C. In some examples, router 12B selects a merge point from the MP-LIST (162). Router 12B prunes the node that represents router 12C from the graph generated by router 12B that represents network 10 (164). Using the pruned graph, router 12B computes a Shortest Path First (SPF) path from router 12B to the selected merge point, e.g., router 12D (166). Because router 12C was pruned from the graph, the computed SPF path will not include router 12C. Based on the computed SPF path, router 12B constructs a label stack of adjacency labels corresponding to BackupPath(PLR,MP, PN) by concatenating the adj-SIDs, or adjacency labels, of the determined SPF path (168). As described in FIG. 4, this label stack may be referred to as BackupLabelStack(PLR, MP, PN). Router 12B may associate BackupLabelStack (PLR, MP, PN) with a label for a router L(PN, MP) in an entry of the context table for router 12C. The entry of the context table may specify a set of actions, such as (1) Pop L(PN, MP) and (2) Push BackupLabelStack(PLR, MP, PN). Accordingly, router 12B may store the BackupLabelStack (PLR, MP, PN) in the context table for router 12C to indicate the BackupPath(PLR,MP, PN) (170).

Router 12B may determine if there are additional merge points in the MP-LIST that have not yet been selected in operation 162 of FIG. 5 (172). If additional merge points remain to be processed (174), router 12B selects a next merge point (162), and performs the techniques as described above with respect to FIG. 5. If no additional merge points remain to be processed (176), router 12B may configure its forwarding entries to forward network packets using the context tables and the labels received from other routers in the same segment routing domain (178). In some examples, router 12B may configure a primary path, which includes router 12C, in its forwarding entries to initially forward network packets to a destination router 12D. Router 12B may also configure a backup path in its forwarding entries, based on the BackupLabelStack(PLR, MP, PN) configured in the context table for router 12C, that does not include router 12C. Router 12B may then forward network packets in accordance with the configured forwarding entries as described in this disclosure.

FIG. 6 is a flowchart that illustrates example operations of a router of FIGS. 1-3 that implements techniques for generating a backup path for a label stack with one or more node labels in a Source Packet Routing in Networking (SPRING)

network, in accordance with techniques of the disclosure. For purposes of illustration only, the example operations are described below within the context of router 12B, as shown in FIGS. 1-3. In the example of FIG. 6, router 12B may exchange SPRING labels with one or more routers of the same segment routing domain (200). As previously described in FIG. 4, each of routers 12 may be configured as part of the same segment routing domain. However, in other examples, one or more other routers and/or one or more of routers 12 may not be included in the same segment routing domain. In some examples, SPRING labels may include adjacency labels and node labels. Router 12B may use IGP to send its SPRING labels to one or more other routers in the same segment routing domain, and the one or more other routers may each send its SPRING labels to router 12B.

Router 12B may detect a configuration request to provide node protection to one or more of routers 12 (202). For instance, router 12B may receive data indicating the request as part of user input provided by an administrator. In some examples, router 12B may receive data indicating the request as part of one or more automated operations. In case, upon receiving the request, router 12B determine whether one or more context tables have already been generated by router 12B for a protected node, such as router 12C in the examples of this disclosure. In some examples, router 12B may determine whether a context table has already been generated for router 12C (204).

If a context table has already been generated router 12B for router 12C with one or more backup paths (208), router 12B may configure its forwarding entries to forward network packets using the context tables and the labels received from other routers in the same segment routing domain (244). If, however, router 12B has not already generated a context table for router 12C with one or more backup paths (206), router 12B may generate a destination node list (DN-LIST) (210). To generate the DN-LIST, router 12B may determine, from a graph that it has generated and that represents the topology of network 10, each destination router that is a drain for network packets of network 10 and/or a network based on a segment routing domain. A destination router that is a drain for network packets may egress packets out of network 10 and/or the segment routing domain that includes router 12B. For instance, router 12B may determine each router that, upon receiving a network packet, does not forward the network packet to another router in network 10 and/or the segment domain that includes router 12B, but instead forwards the network packet to a router or computing device of a different network and/or segment routing domain is a destination router.

Router 12B may iterate through the DN-LIST to determine shortest paths that bypass router 12C. In some examples, router 12B selects a destination router from the DN-LIST (212). Router 12B may determine if the destination node is router 12B, e.g., the PLR router (214). If the selected destination router is router 12B (e.g., the PLR) (218), router 12B may configure one or more of its forwarding entries to perform a lookup for packets based on the label-FIB (L-FIB) for MPLS traffic destined to router 12B and based on the IP-FIB for IP traffic destined to router 12B (220). More generally, router 12B may configure one or more of its forwarding entries to perform a lookup for packets destined to router 12B based on one or more of router 12B's existing FIB entries that define how to forward the network packets to a different network and/or segment routing domain. In other words, if the second label lower than the top label in the label stack of the incoming packet is a node label (corresponding to destination DN) and if the next hop to reach the DN from PN is the PLR itself, then PLR does not have to execute any procedure to create the context table entry. Instead, the backup action is simply to lookup the L-FIB or IP-FIB that has been already populated by LDP and IGP respectively. Router 12B may determine whether any unprocessed destination routers remain in the DN-LIST (238).

If, however, the selected destination router is not router 12B (e.g., is not the PLR) (216), router 12B may determine the shortest path from PN router 12C to the selected destination node (222). To determine the shortest path, router 12B may use a Shortest-Path First (SPF) tree, based on a graph that it has generated and that represents the topology of network 10, with the PN router 12C as root. Any suitable SPF technique may be used to generate the SPF tree and determine the path. The resulting SPF tree yields the shortest path from PN router 12C to the selected destination in the network.

Upon determining the shortest path from router 12C to the selected destination router, router 12B may determine its Next Next Hop (NNH) along the shortest path based on router 12C as the root (224). In some examples, the NNH of router 12B along the shortest path is a router that is one hop away from router 12C and downstream from router 12C en route to the selected destination router. Stated another way, the NNH router may be the next hop after router 12C on the determined shortest path to the destination router. For instance, if router 12G were the selected destination router, router 12D may be a NNH for PLR router 12B along the shortest path from router 12C to router 12G.

Router 12B may determine whether the determined NNH is the PLR router (226). For instance, router 12B may determine whether it is the determined NNH. If the NNH is the PLR router (e.g., router 12B) (231), router 12B may inherit the backup path from router 12B's L-FIB. This will result in Node-SID's in the context table being SPF-forwarded by PLR router 12B after the failure occurs. In other words, router 12B may use the backup path it generated in its L-FIB, that bypasses router 12C, to forward network packets to the destination router in the event that router 12C has failed. Accordingly, router 12B may use the shortest path determined and configured in its L-FIB that avoids router 12C as the backup path for Node-SID's in the context table of PN router 12C (234). Router 12B may store a label stack (e.g., BackupLabelStack(PLR, MP, PN)) for the shortest path that it determined and configured in its L-FIB in the context table for router 12C to indicate the BackupPath (PLR,MP, PN) (236).

If the NNH is not the PLR router (e.g., not router 12B) (230), then the NNH is the merge point for N(PN, DN), for example, where the merge point is described in FIG. 5. Accordingly, router 12B may retrieve the node label N(MP, DN), and configure the entry in the context table for router 12C that corresponds to label N(PN, DN), to insert node label N(MP, DN) underneath the BackupLabelStack(PLR, MP, PN) that was computed in FIG. 5 (232). In other words, router 12B configures the entry of its context table for router 12C that corresponds to node label N(PN, DN), to apply a label stack of BackupLabelStack(PLR, MP, PN) on top of N(MP, DN) as the backup path for N(PN, DN). This resulting label stack may be referred to as BackupLabelStack(PLR, DN, PN) in this disclosure. Router 12B may associate or otherwise store BackupLabelStack(PLR, DN, PN) as the backup path for MPLS route N(PN, DN) in the context table for PN router 12C with following actions in order: (1) Pop N(PN, DN) and (2) Push BackupLabelStack (PLR, DN, PN) (236). Stated another way, PLR router 12B may swap N(PN, DN) with BackupLabelStack(PLR, DN, PN). In this way, router 12B includes a backup path for a packet with node label N(PN, DN) that bypasses router 12C using label stack BackupLabelStack(PLR, DN, PN). Accordingly, router 12B may provide node protection for router 12C when node labels are used to forward network packets.

Router 12B may be determine if there are additional merge points in the DN-LIST that have not yet been selected in operation 212 of FIG. 6 (238). If additional destination nodes remain to be processed (240), router 12B selects a next destination node (212), and performs the techniques as described above with respect to FIG. 6. If no additional merge points remain to be processed (242), router 12B may configure its forwarding entries to forward network packets using the context tables and the labels received from other routers in the same segment routing domain (244).

While context tables may have been applied to p2mp transport LSP aggregation for multicast services and egress node protection for LSPs, both of these are applications of context at "receiver" side. Although context tables might also have been used for p2mp LSP node protection—again at the "receiver" side but not for performing backup actions at "sender" side. That is, the previous applications of context tables may have been implemented at "egress" or "merge point" whereas techniques of this disclosure use context tables where context resides at "point of local repair".

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of the invention have been described. These and other embodiments are within the scope of the following claims.

What is claimed is:

1. A method comprising:
responsive to detecting a configuration request at a first network device to provide node protection to a second network device that is adjacent to the first network device:
   generating, by the first network device, at least one context table, wherein the at least one context table corresponds to the second network device, and wherein the at least one context table includes adjacency labels allocated by the second network device to other network devices that are adjacent to the second network device;
   configuring, at a forwarding unit of the first network device, at least one forwarding entry that indicates:
      a primary path between the first network device and a third network device that includes the second network device, and
      a backup path between the first network device and the third network device that bypasses the second network device, wherein the backup path includes an indication in the at least one context table to replace one of the adjacency labels allocated by the second network device with an adjacency label allocated by another network device to the third network device;
while the second network device has not failed, forwarding, by the first network device and based on the at least one forwarding entry, network packets to the third network device using the primary path; and
responsive to determining that the second network device has failed and that a label stack of the network packets includes the one of the adjacency labels allocated by the second network device,
   updating, by the first network device and based at least in part on the at least one context table, the label stack by replacing the one of the adjacency labels allocated by the second network device with the adjacency label allocated by the another network device to the third network device, and forwarding network packets with the updated label stack to the third network device using the backup path.

2. The method of claim 1, further comprising:
generating, by the first network device, a set of merge points, wherein each respective merge point of the set of merge points represents a respective network device that is adjacent to the second network device;
pruning, by the first network device and from a graph that represents a network topology of a network that includes the first network device and the second network device, a node that represents the second network device; and
for each respective merge point in the set of merge points:
selecting, by the first network device, the respective merge point from the set of merge points,
determining, by the first network device, a shortest path from the first network device to a network device represented by the respective merge point, wherein the shortest path is the backup path, and
generating, by the network device, a backup label stack that corresponds to the backup path.

3. The method of claim 2, wherein a merge point that represents the third network device is included in the set of merge points, and wherein determining the shortest path from the first network device to the merge point that represents the third network device comprises determining a shortest path from the first network device to the third network device.

4. The method of claim 2,
wherein generating the backup label stack that corresponds to the backup path further comprises determining, by the first network device, one or more adjacency labels that correspond respectively to one or more network devices included in the backup path; and
wherein the indication in the at least one context table comprises configuring a set of one or more actions that forward a network packet, the set of actions comprising:
popping, by the first network device and from a label stack of the network packet, an adjacency label that represents an adjacency segment between the second network device and a network device represented by the respective merge point; and
pushing, by the first network device and onto the label stack of the packet, the backup label stack.

5. The method of claim 1, wherein the backup path is based at least in part on a signaling protocol path using at least one of Resource Reservation Protocol (RSVP) or Constraint-based Routing Label Distribution Protocol (CR-LDP).

6. The method of claim 1, further comprising:
generating, by the first network device, a shortest path first tree with the second network device as the root of the shortest path first tree, wherein the shortest path first tree includes the first, second, and third network devices, wherein the third network device is a merge point that is adjacent to the second network device;
responsive to determining a destination network device, determining, by the first network device and based at least in part on the shortest path first tree, a shortest path from the second network device to the third network device, wherein the destination network device egresses network packets from the shortest path first tree; and
determining, by the first network device, a next-next hop (NNH) network device in the shortest path first tree, wherein the NNH network device is adjacent to the second network device and is a next hop from the first network device in the shortest path tree from second network device to the destination network device.

7. The method of claim 6, further comprising:
responsive to determining that the NNH network device is not the first network device and that the NNH network device is the third network device, generating, by the first network device, a backup label stack that corresponds to the backup path from first network device to the NNH network device that does not include the second network device.

8. The method of claim 7,
wherein generating the backup label stack that corresponds to the backup path comprises:
including, by the first network device in the backup label stack, one or more adjacency labels that correspond to a plurality of network devices in the backup path;
inserting, by the first network device and underneath the one or more adjacency labels in the backup label stack, a node label that represents a node segment from the third network device that is the merge point network device to a fourth network device that is the destination network device; and
wherein configuring the at least one forwarding entry comprises defining a set of one or more actions that forwards a network packet, the set of actions comprising:
popping, by the first network device and from a label stack of the network packet, an adjacency label that represents a node segment between the second network device and the third network device that is the merge point network device; and
pushing, by the first network device and onto the label stack of the packet, the backup label stack.

9. The method of claim 6, further comprising:
responsive to determining that the first network device is the NNH, determining, by the first network device, the backup path is a particular path included in a Forwarding Information Base (FIB) of the first network device, the particular path being from the first network device to the third network device and that bypasses the second network device; and
wherein configuring the at least one forwarding entry that indicates the backup path comprises, configuring, by the first network device, the at least one forwarding entry to use, as the backup path, the path included in the FIB of the first network device from the first network device to the third network device that bypasses the second network device.

10. The method of claim 1,
wherein the first network device is a point of local failure (PLR) that provides node protection for a protected node (PN) that is adjacent to the PLR;
wherein the second network device is the PN;
wherein the third network device is at least a merge point that is adjacent to the PN; and
wherein the first, second, and third network devices are configured for a Source Packet Routing in Networking (SPRING) network.

11. A first network device, comprising:
at least one processor;
at least one module operable by the at least one processor to:

responsive to detecting a configuration request at the first network device to provide node protection to a second network device that is adjacent to the first network device:
  generate at least one context table, wherein the at least one context table corresponds to the second network device, and wherein the at least one context table includes adjacency labels allocated by the second network device to other network devices that are adjacent to the second network device;
  configure, at a forwarding unit of the first network device, at least one forwarding entry that indicates:
    a primary path between the first network device and a third network device that includes the second network device, and
    a backup path between the first network device and the third network device that bypasses the second network device, wherein the backup path includes an indication in the at least one context table to replace one of the adjacency labels allocated by the second network device with an adjacency label allocated by another network device to the third network device;
  while the second network device has not failed, forward, based on the at least one forwarding entry, network packets to the third network device using the primary path; and
  responsive to determining that the second network device has failed and that a label stack of the network packets includes the one of the adjacency labels allocated by the second network device,
    update, based at least in part on the at least one context table, the label stack by replacing the one of the adjacency labels allocated by the second network device with the adjacency label allocated by the another network device to the third network device, and
    forward network packets with the updated label stack to the third network device using the backup path.

12. The first network device of claim 11, wherein the at least one module is operable by the at least one processor to:
  generate a set of merge points, wherein each respective merge point of the set of merge points represents a respective network device that is adjacent to the second network device;
  prune, from a graph that represents a network topology of a network that includes the first network device and the second network device, a node that represents the second network device; and
  for each respective merge point in the set of merge points:
    select the respective merge point from the set of merge points,
    determine a shortest path from the first network device to a network device represented by the respective merge point, wherein the shortest path is the backup path, and
    generate a backup label stack that corresponds to the backup path.

13. The first network device of claim 12, wherein a merge point that represents the third network device is included in the set of merge points, and wherein determining the shortest path from the first network device to the merge point that represents the third network device comprises determining a shortest path from the first network device to the third network device.

14. The first network device of claim 12,
  wherein the at least one module that generates the backup label stack that corresponds to the backup path further determines one or more adjacency labels that correspond respectively to one or more network devices included in the backup path; and
  wherein the indication includes a set of one or more actions that forward a network packet, the set of actions comprising:
    pop, from a label stack of the network packet, an adjacency label that represents an adjacency segment between the second network device and a network device represented by the respective merge point; and
    push, onto the label stack of the packet, the backup label stack.

15. The first network device of claim 11, wherein the backup path is based at least in part on a signaling protocol path using at least one of Resource Reservation Protocol (RSVP) or Constraint-based Routing Label Distribution Protocol (CR-LDP).

16. The first network device of claim 11, wherein the at least one module is operable by the at least one processor to:
  generate a shortest path first tree with the second network device as the root of the shortest path first tree, wherein the shortest path first tree includes the first, second, and third network devices, wherein the third network device is a merge point that is adjacent to the second network device;
  responsive to determining a destination network device, determine, based at least in part on the shortest path first tree, a shortest path from the second network device to the third network device, wherein the destination network device egresses network packets from the shortest path first tree; and
  determine a next-next hop (NNH) network device in the shortest path first tree, wherein the NNH network device is adjacent to the second network device and is a next hop from the first network device in the shortest path tree from second network device to the destination network device.

17. The first network device of claim 16, wherein the at least one module is operable by the at least one processor to:
  responsive to determining that the NNH network device is not the first network device and that the NNH network device is the third network device, generate a backup label stack that corresponds to the backup path from first network device to the NNH network device that does not include the second network device.

18. The first network device of claim 17,
  wherein the at least one module that generates the backup label stack that corresponds to the backup path:
    includes, in the backup label stack, one or more adjacency labels that correspond to a plurality of network devices in the backup path;
    inserts, underneath the one or more adjacency labels in the backup label stack, a node label that represents a node segment from the third network device that is the merge point network device to a fourth network device that is the destination network device; and
  wherein the at least one module, that configures the at least one forwarding entry, defines a set of one or more actions that forwards a network packet, the set of actions comprising:

pop, from a label stack of the network packet, an adjacency label that represents a node segment between the second network device and the third network device that is the merge point network device; and push, onto the label stack of the packet, the backup label stack.

19. The first network device of claim 16, wherein the at least one module is operable by the at least one processor to:

responsive to determining that the first network device is the NNH, determine the backup path is a particular path included in a Forwarding Information Base (FIB) of the first network device, the particular path being from the first network device to the third network device and that bypasses the second network device; and configure the at least one forwarding entry to use, as the backup path, the path included in the FIB of the first network device from the first network device to the third network device that bypasses the second network device.

20. The first network device of claim 11, wherein the first network device is a point of local failure (PLR) that provides node protection for a protected node (PN) that is adjacent to the PLR;

wherein the second network device is the PN;

wherein the third network device is at least a merge point that is adjacent to the PN; and wherein the first, second, and third network devices are configured for a Source Packet Routing in Networking (SPRING) network.

21. A non-transitory computer-readable medium comprising instructions for causing at least one programmable processor of a first network device to:

responsive to detecting a configuration request at the first network device to provide node protection to a second network device that is adjacent to the first network device:

generate at least one context table, wherein the at least one context table corresponds to the second network device, and wherein the at least one context table includes adjacency labels allocated by the second network device to other network devices that are adjacent to the second network device;

configure, at a forwarding unit of the first network device, at least one forwarding entry that indicates:

a primary path between the first network device and a third network device that includes the second network device, and a backup path between the first network device and the third network device that bypasses the second network device, wherein the backup path includes an indication in the at least one context table to replace one of the adjacency labels allocated by the second network device with an adjacency label allocated by another network device to the third network device;

while the second network device has not failed, forward, based on the at least one forwarding entry, network packets to the third network device using the primary path; and responsive to determining that the second network device has failed and that a label stack of the network packets includes the one of the adjacency labels allocated by the second network device, update, based at least in part on the at least one context table, the label stack by replacing the one of the adjacency labels allocated by the second network device to the third network device with the adjacency label allocated by the another network device to the third network device, and forward network packets with the updated label stack to the third network device using the backup path.

* * * * *